(12) United States Patent
Tilley et al.

(10) Patent No.: US 10,993,385 B2
(45) Date of Patent: May 4, 2021

(54) VEGETATED CANOPY APPARATUS, SYSTEM, AND METHOD

(71) Applicant: UNIVERSITY OF MARYLAND, College Park, MD (US)

(72) Inventors: David R. Tilley, University Park, MD (US); Jose-Luis Izursa, Beltsville, MD (US); Nick Cloyd, Berwyn Heights, MD (US); Timothy Williamson, Chevy Chase, MD (US)

(73) Assignee: University of Maryland, College Park, College Park, MD (US)

( * ) Notice: Subject to any disclaimer, the term of this patent is extended or adjusted under 35 U.S.C. 154(b) by 273 days.

(21) Appl. No.: 15/770,852

(22) PCT Filed: Oct. 26, 2016

(86) PCT No.: PCT/IB2016/056440
§ 371 (c)(1),
(2) Date: Apr. 25, 2018

(87) PCT Pub. No.: WO2017/072677
PCT Pub. Date: May 4, 2017

(65) Prior Publication Data
US 2018/0325044 A1    Nov. 15, 2018

Related U.S. Application Data

(60) Provisional application No. 62/248,480, filed on Oct. 30, 2015.

(51) Int. Cl.
*A01G 17/06* (2006.01)
*A01G 9/12* (2006.01)
(Continued)

(52) U.S. Cl.
CPC ............. *A01G 17/06* (2013.01); *A01G 9/022* (2013.01); *A01G 9/12* (2013.01); *A01G 13/0212* (2013.01); *A01G 13/0206* (2013.01)

(58) Field of Classification Search
CPC .... A01G 2009/003; A01G 9/033; A01G 9/12; A01G 9/124; A01G 9/1423; A01G 9/128; A01G 9/22
(Continued)

(56) References Cited

U.S. PATENT DOCUMENTS 425,745 A * 4/1890 Brown .................... A01G 9/12
                                                               47/47
775,683 A * 11/1904 Seelhorst, Jr. ........... A01G 9/12
                                                               47/44
(Continued)

FOREIGN PATENT DOCUMENTS

| CN | 203181652 | 9/2013 |
|---|---|---|
| CN | 204119906 | 1/2015 |
| JP | 2014-233218 | 12/2014 |

OTHER PUBLICATIONS

"Growing Garden Umbrella," Popular Mechanics, vol. 98, No. 1, Jul. 1952, p. 167.
USPTO, ISR-WO, PCT Appl. PCT/IB2016/056440, Jan. 19, 2017.

*Primary Examiner* — Christopher D Hutchens
(74) *Attorney, Agent, or Firm* — Rockridge Venture Law; Kevin Christopher; Andrew Lerner

(57) ABSTRACT

A system may include a support structure for providing a vegetated canopy including a soil container support and a plurality of ribs disposed along the support structure, where the plurality of ribs are structurally configured to support a vegetated canopy disposed thereon. The system may also include a modular canopy structurally configured to attach to the support structure, the modular canopy including a soil container structurally configured to engage with the soil
(Continued)

container support, a plurality of substantially rigid external members structurally configured to engage with a rib of the support structure, and a connecting member disposed along a length of the substantially rigid external members and attaching at a substantially rigid external member to another substantially rigid external member. The plurality of substantially rigid external members and the connecting members may form a trellis structurally configured to support vegetation.

18 Claims, 12 Drawing Sheets

(51) Int. Cl.
*A01G 9/02* (2018.01)
*A01G 13/02* (2006.01)

(58) Field of Classification Search
USPC .................................................. 47/79
See application file for complete search history.

(56) References Cited

U.S. PATENT DOCUMENTS

| | | | |
|---|---|---|---|
| 1,055,914 A * | 3/1913 | Hus .................... | A01G 9/12 47/45 |
| 4,194,319 A | 3/1980 | Crawford | |
| 4,361,982 A | 12/1982 | Horowitz | |
| 4,942,693 A | 7/1990 | Sibold | |
| 6,038,813 A * | 3/2000 | Moore .................... | A01G 9/029 47/75 |
| 6,393,764 B1 * | 5/2002 | Smith .................... | A01G 9/02 47/65.5 |
| 6,557,335 B2 | 5/2003 | Amaro et al. | |
| 6,612,713 B1 | 9/2003 | Kuelbs | |
| 7,036,270 B1 * | 5/2006 | Shepherd .................... | A01G 9/16 47/18 |
| D579,230 S | 10/2008 | Denham | |
| 8,756,860 B1 * | 6/2014 | Murphy .................... | A47G 7/042 47/47 |
| 8,857,103 B1 * | 10/2014 | Coon .................... | A01G 9/124 47/70 |
| 2001/0037599 A1 | 11/2001 | McIntyre | |
| 2001/0047617 A1 * | 12/2001 | Blossom .................... | A01G 31/02 47/62 R |
| 2002/0088171 A1 * | 7/2002 | Shepherd .................... | A01G 9/1423 47/17 |
| 2006/0005466 A1 * | 1/2006 | Atchley .................... | A01G 9/024 47/39 |
| 2007/0151150 A1 * | 7/2007 | Sandoval .................... | A01G 9/02 47/66.1 |
| 2008/0190020 A1 * | 8/2008 | Todd .................... | A01G 25/167 47/48.5 |
| 2008/0313960 A1 * | 12/2008 | Norvitch .................... | A01G 9/02 47/79 |
| 2009/0293354 A1 * | 12/2009 | Goldberg .................... | A01G 25/167 47/66.6 |
| 2010/0275513 A1 * | 11/2010 | De Miranda Macdowell .................... | E04B 1/3412 47/79 |
| 2011/0197505 A1 * | 8/2011 | Hansen .................... | A01G 9/12 47/65.8 |
| 2011/0215937 A1 * | 9/2011 | Carroll .................... | A01G 9/025 340/604 |
| 2013/0333281 A1 | 12/2013 | Donitz | |
| 2014/0196365 A1 * | 7/2014 | Washington .................... | A01G 9/02 47/66.6 |
| 2014/0305040 A1 * | 10/2014 | Hall .................... | A47G 7/041 47/65.5 |
| 2015/0223413 A1 * | 8/2015 | Lalicata .................... | A01G 9/12 47/44 |
| 2016/0242369 A1 * | 8/2016 | Caceres .................... | A01G 27/005 |
| 2018/0014487 A1 * | 1/2018 | Tinsley .................... | A01G 9/12 |

* cited by examiner

VEGETATED CANOPY APPARATUS, SYSTEM, AND METHOD

CROSS-REFERENCE TO RELATED APPLICATIONS

This application is a national stage entry application of International Patent Application No. PCT/IB2016/05644, filed on Oct. 26, 2016, which claims priority to U.S. Provisional Patent Application No. 62/248,480, filed on Oct. 30, 2015, the entire content of which is hereby incorporated by reference.

BACKGROUND

Vegetated canopies of the prior art often consist of hanging plants disposed on an elevated structure. Vegetated canopies of the prior art may also include climbing plants originating from soil containers disposed at or near a base of a structure for ease of access, e.g., for watering and maintenance. More complex vegetated canopies may include a trellis, e.g., a framework of light wooden or metal bars used to support climbing plants, attached to an elevated structure in a permanent manner. These vegetated canopies are often cumbersome for maintenance and care. For example, watering these vegetated canopies often requires climbing a ladder or otherwise accessing the elevated vegetation. Furthermore, it is often cumbersome or impossible for a user to move the vegetated canopy, or to exchange or replace the vegetated canopy for a different plant, e.g., due to a change in season, when a plant fails, or otherwise. There remains a need for improved apparatuses, devices, systems, and methods for providing vegetated canopies.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
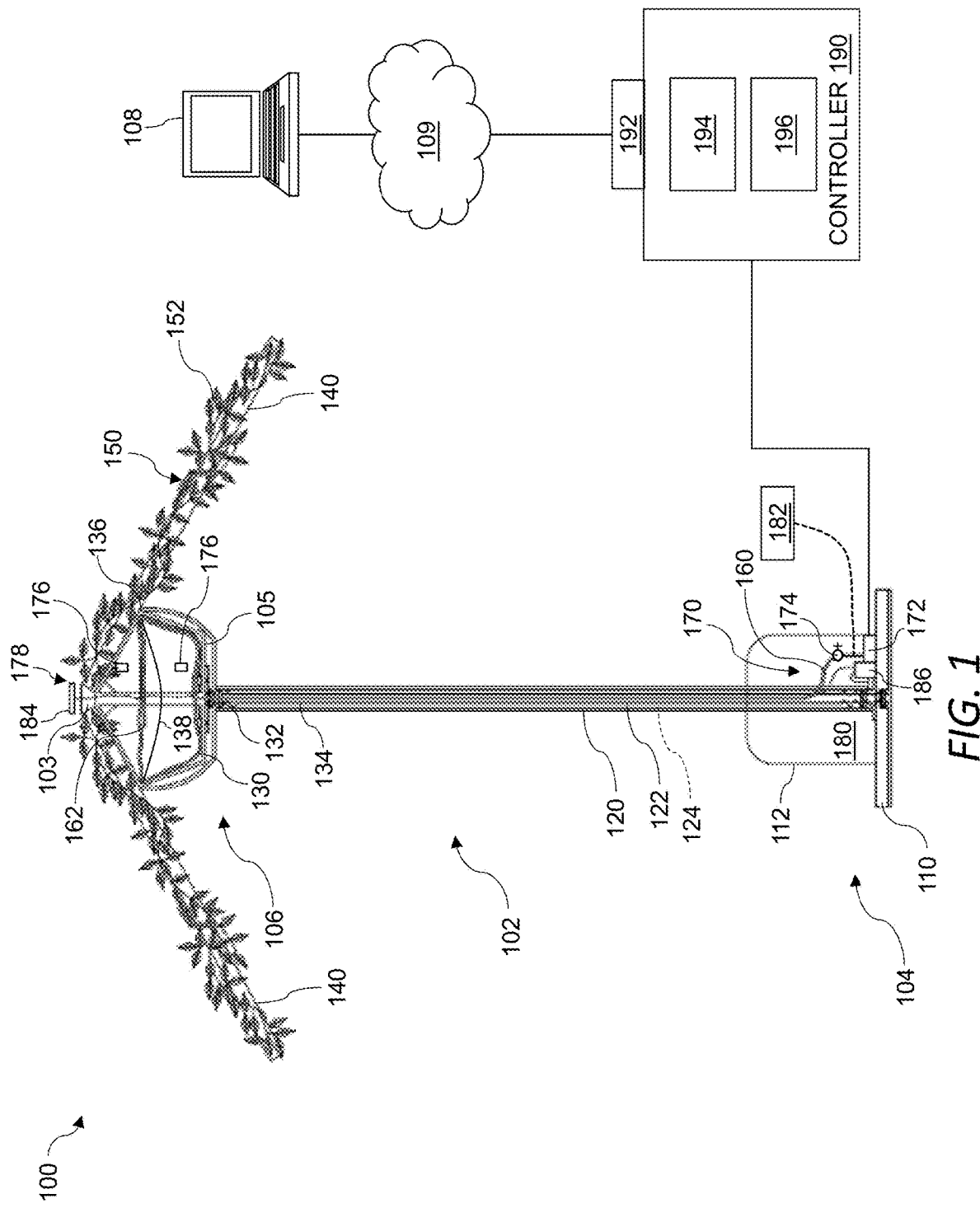
FIG. 1 illustrates an apparatus including a vegetated canopy, in accordance with a representative embodiment.

The various methods, systems, apparatuses, and devices described herein generally provide for vegetated canopies and the like.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

As discussed herein, the disclosure may include methods, systems, apparatuses, and devices for providing vegetated canopies and the like. In general, a "canopy" as described herein may include any covering (including full covering or partial covering), overhang, decoration, hanging structure, and the like. Thus, a "vegetated canopy" as described herein may include a canopy that utilizes one or more of vines, herbs, woody shrubs, woody trees, climbing plants, clinging plants, or other plant materials on a canopy.

A vegetated canopy may advantageously provide one or more of a naturally shaded environment, a naturally cooled environment, an environment with reduced volatile organic toxins, an environment with reduced noise levels, an environment with reduced ultraviolet radiation, and the like. In other words, a vegetated canopy may advantageously reduce the penetration of ultraviolet, visible, and near-infrared light through the canopy, emanating from the sun, to provide a naturally designed aesthetic, reduce the use of artificial textile materials, offer a living, regenerative canopy, and allow for a cooler ambient temperature due to the evaporative cooling of vascular plant transpiration (i.e., water emitted from the leaf, which has an evaporative cooling effect).

Implementations may generally include a support structure for providing a vegetated canopy and a modular canopy structurally configured to attach to the support structure. The support structure and the vegetated canopy may combine to form a vegetated canopy system. Such a vegetated canopy system may be self-contained, e.g., allowing for mobility of the system, and self-sustaining, allowing for ease of maintenance. For example, the vegetated canopy system may include a self-contained irrigation system and rechargeable power supply, e.g., utilizing solar or wind power. The vegetated canopy system may also or instead be a modular system, where one or more modular vegetated canopies can be removed, replaced, rearranged, and so forth, by a user in a relatively easy manner.

As described herein, the support structure may take many forms, including without limitation umbrellas, awnings, tents, shades (e.g., sunshades, sail shades, and the like), sitting areas (e.g., picnic tables, park benches, and the like), waiting areas (e.g., bus stops, train stations, and the like), pergolas, canopy tents (e.g., tailgate canopies), storage structures, sidewalk sheds, freestanding structures, structures attached to a building, structures attached to a landform or geologic formation, and the like. FIGS. 1-4 below generally illustrate one such structure—an umbrella—by way of example and not of limitation. One skilled in the art will recognize that many different structures are also or instead possible using the features and techniques described herein.

FIG. 1 illustrates an apparatus including a vegetated canopy, in accordance with a representative embodiment. As shown in the figure, in this embodiment, the apparatus 100 for providing a vegetated canopy may include an umbrella as a structure for supporting the canopy, but, as stated throughout this disclosure, other apparatuses and structures are possible. In an embodiment including an umbrella, implementations can be thought of as a 'living umbrella' because of the vegetated canopy that may be included thereon.

The apparatus 100 may include a structural frame 102. The structural frame 102 may include a base 110, a post 120, a soil container 130, and a rib 140 or plurality of ribs 140.

The base 110 may be disposed on a bottom end 104 of the structural frame 102. The base 110 may include one or more plates (e.g., about 0.5 inch thick metal plates, where the plates may include dimensions of about 2 feet×2 feet) located at the bottom end 104 of the structural frame 102. The base 110 may include a housing 112, such as a hemispherical casing or the like that houses various electronics, mechanical components, and/or a water reservoir 180.

The post 120 may be connected to the base 110. The post 120 may extend from the bottom end 104 of the structural frame 102 to a top end 106 of the structural frame 102. The post 120 may include a pathway 122 formed therein or thereon. The pathway 122 may be formed in a hollow core 124 of the post 120. The pathway 122 may also or instead be located externally relative to the post 120. The post 120 may be attached to the base 110 via a male receiver or the like on the base 110 (e.g., a cylindrical male receiver that extends vertically about 10 inches from the base 110) that engages with a female end of the post 120. Other configurations are possible, such as the post 120 attaching to the base 110 via a cylindrical female receiver or the like that extends vertically about 18 inches from the base 110.

In an implementation, the post 120 may be adapted to contain one or more drain lines 134 for drainage from the soil container 130, one or more supply lines 160, and wiring or the like for a power supply 178.

The soil container 130 may be connected to the post 120 at the top end 106 of the structural frame 102. In this manner, the soil container 130 may be a raised container, e.g., disposed at or near the canopy of the umbrella-like structure. The soil container 130 may include a structure for receiving a pot of soil or the like, e.g., containing roots or seeds of a plant. The soil container 130 may also or instead itself integrally include a pot of soil or the like.

The soil container 130 may include a drain 132 or the like. The drain 132 may be in communication with the pathway 122 of the post 120. In this manner, the drain 132 may be structurally configured to drain excess water from the soil container 130 through the pathway 122. In an implementation, drainage may be provided by a drain line 134 disposed in the pathway 122 from the drain 132 of the soil container 130 to the bottom end 104 of the structural frame 102. The drain line 134 may include a hose or tube disposed in the pathway 122 of the post 120.

In an implementation, the soil container 130 may be a raised container made of metal or the like affixed to the top of the post 120, where the connection between the soil container 130 and the post 120 maintains a drain 132, e.g., for draining excess water from irrigation or rainfall. The post 120 may also or instead act as a conduit for wiring and a supply line 160 (e.g., for providing a water or nutrient supply). The soil container 130 may hold natural or engineered soil and the roots of a plant as well as a soaker hose and/or a drip irrigation tube.

As discussed above, the soil container 130 may include a housing or basin for receiving soil growing media, water, live vascular plants, and soil sensors. The soil container 130 may also or instead include a support (e.g., a housing or basin) for receiving an external soil container/potted plant therein or thereon. For example, the one or more vegetated canopies 150 may include a soil container/housing structurally configured to engage with a soil container support of the structural frame 102 (see, e.g., FIG. 7).

The plurality of ribs 140 may project from the top end 106 of the structural frame 102. For example, the plurality of ribs 140 may project from one or more of the soil container 130, a vertex 103 of the structural frame 102, and a support skeleton 105 disposed at the top end 106 of the structural frame 102.

The plurality of ribs 140 may be structurally configured to support one or more vegetated canopies 150 disposed thereon. The plurality of ribs 140 may be sized, shaped, and/or arranged to receive one or more vegetated canopies 150 in one or more predetermined configurations. The ribs 140 may also or instead be adapted to support the limbs, leaves, and other parts of a vascular plant.

Thus, in an implementation, one or more vegetated canopies 150 may be disposed on the plurality of ribs 140. The one or more vegetated canopies 150 may include one or more vascular plants selected such that the vegetated canopies 150 can perform one or more of: absorbing direct and indirect ultraviolet radiation; reducing noise by absorbing sounds in wave frequencies audible to a human ear; providing shade by absorbing and reflecting direct and indirect solar radiation; absorbing heat from its immediate surroundings via plant leaf transpiration; and removing volatile organic compounds from its immediate surroundings via plant leaf gas exchange. For example, the vegetated canopies 150 may absorb a majority of the direct and indirect ultraviolet radiation (e.g., A+B, 290-400 nm) from the sun and surrounding surfaces. Also, soil included as part of the soil container 130 or the vegetated canopies 150 may include a natural or engineered soil that removes volatile organic compounds from their immediate vicinity via the process of soil microbial metabolism.

The plurality of ribs 140 may be specifically tailored to be structural elements of an umbrella-like structure. For example, the plurality of ribs 140 may include members extending radially about a central axis. In other implementations, the plurality of ribs 140 may simply be elements of a structure (e.g., a non-umbrella structure such as an awning or the like) that are structurally configured to receive one or more vegetated canopies 150 thereon, e.g., structurally configured to receive or engage with substantially rigid external members of a vegetated canopy 150. For example, the plurality of ribs 140 may include members extending substantially linearly along the length of a joining member or structure, where each of the plurality of ribs 140 may be substantially parallel to one another. The plurality of ribs 140 may thus include substantially linear structures. However, other shapes are also or instead possible, such as curved shapes, zig-zags, and the like.

The plurality of ribs 140 may include at least four ribs 140 affixed to a rim 136 of the soil container 130, or otherwise affixed to the top end 106 of the structural frame 102. One skilled in the art will recognize that more or less ribs 140 are possible. For example, while one implementation includes at least four ribs 140, another implementation includes two or three ribs 140, and yet another implementation includes at least five ribs 140, and yet another implementation includes at least eight ribs 140, and yet another implementation includes at least sixteen ribs 140, and yet another implementation includes at least twenty-four ribs 140, and so on and so forth. Other numbers are possible. Each rib 140 in the plurality of ribs 140 may be substantially equally spaced apart from one another.

Each rib 140 in the plurality of ribs 140 may be connected to the top end 106 of the structural frame 102 via a hinged connection that permits the plurality of ribs 140 to be lowered and raised by a user. For example, the apparatus 100 may include a hinged connection on the support skeleton 105. The apparatus 100 may also or instead include a ring 138 or the like disposed at the top end of the structural frame 102 to which the ribs 140 are engaged when in a raised position. Releasing the ribs 140 from the ring 138 may permit the ribs 140 to be lowered, e.g., by a user. In an implementation, at least one rope, cable, or chain is secured to ends of the plurality of ribs 140, where the mechanism formed by the ribs 140 and rope, cable, or chain is structurally configured to raise and lower the plurality of ribs 140 by engaging and disengaging the ribs 140 from the ring 138. In an implementation, the ribs 140 include a spring-like member that automatically engages the ribs 140 with the ring 138 when the ribs 140 are raised, and where the pulling on the rope, cable, or chain compresses the spring to disengage the ribs 140 from the ring 138. Other mechanisms are also or instead possible, such as those described below in FIG. 7 and FIG. 13. For example, the ribs 140 may be hinged on the ring 138 and engage with the vertex 103 (or other finial or sub-finial structure) via a latching system or locking system such as that described below with reference to FIG. 13. In an implementation, the ring 138 may be rim of the soil container 130 or a structure that supports the soil container 130.

The ribs 140 may be substantially cylindrical in shape, or they may include other shapes. The ribs 140 may include a diameter of about 0.5 inches, and/or a length of about 42 to 72 inches. As discussed herein, the ribs 140 may be affixed via hinges or the like, e.g., to the rim 136 of the soil container 130 or otherwise to the top end 106 of the structural frame 102, at equally spaced distances along the rim 136 or other structure. The ribs 140 may be able to be lowered and raised to extend or contract the vegetated canopy 150. As discussed above, when the ribs 140 are raised, the top ends of the ribs 140 may be clipped to a relatively small ring 138 or the like, which may be located above the post 120, above the center of the soil container 130, or around a circumference of the soil container 130. To lower the vegetated canopy 150 into a contracted position, the top ends of the ribs 140 may be released from their clips and allowed to rise using ropes or the like that are secured to their ends. The rib-ropes may be attached to a central rope, which can be held stationary with a cam-cleat or the like, e.g., located on the upper portion of the post 120 near the soil container 130.

The apparatus 100 may include a supply line 160 for providing water and/or nutrients to soil included in the soil container 130 and/or vegetation 152 included on the vegetated canopy 150. The supply line 160 may be disposed in the pathway 122 of the post 120 from the bottom end 104 of the structural frame 102 to the top end 106 of the structural frame 102 to provide one or more of water and nutrients from the bottom end 104 of the structural frame 102 to the top end 106 of the structural frame 102.

The apparatus 100 may further include an irrigation system 170. The irrigation system 170 may be a 'smart' irrigation system that allows the apparatus 100 to be self-contained, e.g., where the apparatus 100 can maintain the health of vegetation 152 included on the vegetated canopy 150 without maintenance or interference from an outside source, or with relatively minimal maintenance or interference from an outside source. The irrigation system 170 may include a control system programmable to maintain soil water content within a targeted range based on desired levels of plant growth and to maintain a healthy plant.

The irrigation system 170 may include one or more of a pump 172, a valve 174, a controller 190, and a power supply 178.

The pump 172 and/or the valve 174 may be connected to the supply line 160, where one or more of the pump 172 and the valve 174 are structurally configured to control an amount of water and/or nutrients supplied through the supply line 160 to the top end 106 of the structural frame 102.

In an implementation, the valve 174 may be omitted and only the pump 172 may be present. For example, in an embodiment, the supply line 160 is in fluid communication with the pump 172 and a reservoir 180 containing water. In such an embodiment, the pump 172 may be controlled by the controller 190 to pump water (e.g., as needed or based on a schedule or the like) from the reservoir 180 to the top end 106 of the structural frame 102 for supplying one or more of water and nutrients from the bottom end 104 of the structural frame 104 to the top end 106 of the structural frame 102. In an implementation, the base 110 houses the reservoir 180 and the pump 172 as shown in the figure.

In another implementation, the pump 172 may be omitted and only the valve 174 may be present. For example, in an embodiment, the supply line 160 is in fluid communication with at least one of a hose and a hose bibb 182. In such an embodiment, the hose bibb 182 may supply adequate water pressure to provide water to the top end 106 of the structural frame 102, where an amount of water supplied is controlled by the valve 174. The valve 174 may thus include a solenoid valve or the like that can open and close based on a signal provided, e.g., an electrical signal sent by the controller 190.

The irrigation system 170 may include a dispensing mechanism 162 for supplying water and/or nutrients to one or more of soil contained in the soil container 130 and a vegetated canopy 150 disposed on the structural frame 102. In an implementation, the dispensing mechanism 162 may include one or more of a soaker hose and a drip irrigation tube disposed in the soil container 130 and connected to the supply line 160. The dispensing mechanism 162 may also or instead be in engagement with the top end 106 of the structural frame 102 for supplying water and/or nutrients to the vegetated canopy 150.

The irrigation system 170 may further include one or more sensors 176. In an implementation, at least one sensor 176 is configured to detect a moisture level in soil contained in the soil container 130. The controller 190 may be configured to receive a signal from the sensor (e.g., a first signal) and to control operation of one or more of the pump 172 and the valve 174 in response to the signal. The controller 190 may thus be configured to maintain a moisture level in soil contained in the soil container 130 within a predetermined range.

In an implementation, at least one of the sensors 176 is configured to detect a thermal property of one or more of soil contained in the soil container 130 and a vegetated canopy 150 disposed on the structural frame 102. For example, at least one of the sensors 176 may include a thermistor or the like for detecting a temperature of one or more of soil contained in the soil container 130 and a vegetated canopy 150 disposed on the structural frame 102. The controller 190 may be configured to receive a signal from the sensor (e.g., a second signal) and to control operation of one or more of the pump 172 and the valve 174 in response to the signal. The controller 190 may thus be configured to maintain a temperature of one or more of soil contained in the soil container 130 and a vegetated canopy 150 disposed on the structural frame 102 within a predetermined range.

Thus, in an implementation, at least one of the sensors 176 includes a soil moisture sensor, and at least one of the sensors 176 includes a thermal sensor. In this manner, the soil moisture sensor can be thought of as a first sensor that sends a first signal to the controller 190, and the thermal sensor can be thought of as a second sensor that sends a second signal to the controller 190. The controller 190 may thus be configured to receive one or more of the first signal and the second signal from the first and second sensor, respectively, and to control operation of one or more of the pump 172 and the valve 174 in response to at least one of the first signal and the second signal. One skilled in the art will recognize that more or less sensors are possible. For example, sensors can be included that sense thermal properties, atmospheric properties, contaminants, insects, fungus, pressure, humidity, and so forth. For example, the one or more sensors 176 may also or instead include one or more of ultrasonic sensors, optical sensors, infrared sensors, temperature sensors, sound sensors, chemical sensors (e.g., oxygen, carbon-dioxide, and so on), motion and proximity sensors, flow sensors, radiation sensors, imaging sensors, pressure sensors, shock sensors, force sensors, and the like.

The controller 190 may be programmed to control operation of at least one of the pump 172 and the valve 174. As discussed above, controlling operation of the pump 172 and the valve 174 may be based on signals received from one or more sensors 176. Controlling operation of the pump 172 and the valve 174 may also or instead be based on a predetermined time interval or a predetermined schedule. Thus, implementations may include a controller 190 programmed to control an amount of water and/or nutrients supplied to at least one of the soil container 130 and a vegetated canopy 150 disposed on the structural frame 102 based on one or more of a predetermined time interval or a predetermined schedule.

The controller 190 may include a communications interface 192, e.g., for connection to a computing device 108 through a network 109. The controller 190 may also or instead include, or otherwise be in communication with, a processor 194, a memory 196, and any other hardware or software to perform its functions as described herein. In an implementation, the processor 194 may be programmable, e.g., by the computing device 108 of a user, to set a predefined or machine-learned sequence of actuation for the irrigation system 170.

The controller 190 may be electrically coupled in a communicating relationship, e.g., an electronic communication, with any of the components of the apparatus 100, or with one or more external devices such as the computing device 108 of a user. In general, the controller 190 may be operable to control the components of the apparatus 100, such as the irrigation system 170. The controller 190 may include any combination of software and/or processing circuitry suitable for controlling the various components of the apparatus 100 described herein including without limitation processors 194, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one implementation, the controller 190 may include a microprocessor or other processing circuitry with sufficient computational power to provide related functions such as executing an operating system, providing a graphical user interface (e.g., to a display coupled to the controller 190), set and provide rules and instructions for operation of the apparatus 100, and operate a web server or otherwise host remote operators and/or activity through the communications interface 192. The controller 190 may include a printed circuit board, an Arduino controller or similar, a Raspberry Pi controller or the like, a prototyping board, or other computer related components.

The computing device 108 may include a desktop computer workstation. The computing device 108 may also or instead be any device suitable for interacting with other devices over a network 109, such as a laptop computer, a desktop computer, a personal digital assistant, a tablet, a mobile phone, a television, a set top box, a wearable computer, and the like. The computing device 108 may also or instead include a server or it may be disposed on a server. In certain implementations, the computing device 108 may be implemented using hardware (e.g., in a desktop computer), software (e.g., in a virtual machine or the like), or a combination of software and hardware. The computing device 108 may be a standalone device, a device integrated into another entity or device, a platform distributed across multiple entities, or a virtualized device executing in a virtualization environment.

The network 109 may include any network described herein or known in the art, e.g., data network(s) or internetwork(s) suitable for communicating data and control information among participants. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants. The network 109 may also include a combination of data networks, and need not be limited to a strictly public or private network.

The communications interface 192 may include any hardware and/or software for connecting the controller 190 in a communicating relationship with other resources through the network 109. This may include remote resources accessible through the Internet, as well as local resources available using short range communications protocols using, e.g., physical connections (e.g., Ethernet), radio frequency communications (e.g., Wi-Fi), optical communications, (e.g., fiber optics, infrared, or the like), ultrasonic communications, or any combination of these or other media that might be used to carry data between devices. The communications interface 192 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the communications interface 192 may include any combination of hardware and software suitable for coupling the components to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 109 such as the Internet. This may also or instead include hardware/software for a WiMax connection or a cellular network connection (using, e.g., CDMA, GSM, LTE, or any other suitable protocol or combination of protocols).

The processor 194 may be any as described herein or otherwise known in the art. The processor 194 may be included on the controller 190, or it may be separate from the controller 190, e.g., it may be included on a computing device 108 in communication with the controller 190. In one implementation, the processor 194 is included on or in communication with a server that hosts an application for operating and controlling the apparatus 100.

The processor 194 may be any processor or other processing circuitry capable of processing instructions for execution of the techniques described herein, e.g., for 'smart' irrigation. The processor 194 may include a single-threaded processor, a multi-threaded processor, a multi-core processor and so forth. The processor 194 may be capable of processing instructions stored in the memory 196 or a data store of the computing device 108.

The memory 196 may be any as described herein or otherwise known in the art. The memory 196 may contain computer code and may store data such as predefined or machine-learned sequences of actuation or other relevant data. The memory 196 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 196 may store program instructions, program data, executables, and other software and data useful for operation of the controller 190 and configuring the apparatus 100 to perform functions for a user. The memory 196 may include a number of different stages and types of memory for different aspects of operation. For example, a processor 194 may include on-board memory and/or cache for faster access to certain data or instructions, and a separate, main memory or the like may be included to expand memory capacity as desired. All such memory types may be a part of the memory 196 as contemplated herein.

The memory 196 may, in general, include a non-volatile computer readable medium containing computer code that, when executed by the controller 190 or computing device 108 creates an execution environment for a computer program in question, e.g., code that constitutes processor firmware, a protocol stack, a database management system, an operating system, or a combination of the foregoing, and/or code that performs some or all of the steps set forth in the various flow charts and/or other algorithmic descriptions set forth herein. The processor 194 and the memory 196 can be supplemented by, or incorporated in, logic circuitry.

The power supply 178 may be electrically coupled to one or more of the pump 172, the valve 174, and the controller 190. In an aspect, the power supply 178 may also or instead be used to power a mechanism for raising and lowering the ribs 140.

In an implementation, as shown in the figure, the power supply 178 includes a photovoltaic panel 184 and a rechargeable battery 186. The photovoltaic panel 184 may be disposed on the top end 106 of the structural frame 102 and electrically coupled to the rechargeable battery 186 (e.g., through a wired connection) to charge the rechargeable battery 186. Thus, the power supply 178 may include a solar energy system adapted to collect solar energy and convert the solar energy into electrical energy, where the solar energy system is conductively coupled to a rechargeable electrical power system for providing electrical power to one or more of the pump 172, the controller 190, and sensors 176.

The structural frame 102 described above may include parts made from metal. For example, the structural frame 102 may include metallic parts including one or more of the base 110, the reservoir 180, the post 120, the raised soil container 130, the ribs 140, and various hardware (e.g., cam-cleats, clutches, hinges, pins, roller furling, and the like). One or more of these parts may also or instead be made from other materials such as plastic, wood, ceramic, and the like.

The apparatus 100 described above may include components that house the battery 186, a battery charger, the pump 172, the controller 190, and parts for raising and lowering the ribs 140 and vegetated canopies 150.

The apparatus 100 described above may thus include a 'living umbrella'—e.g., a garden or patio umbrella with a vegetated canopy that utilizes vines, herbs, woody shrubs, woody trees or other plant materials, growing in a raised container of natural or engineered soil, to provide one or more of a naturally shaded environment, a naturally cooled environment, a movable canopy, its own 'smart' irrigation system, a rechargeable power supply, an option for solar cells for power, an environment with reduced volatile organic toxins, an environment with reduced noise levels, and an environment with reduced ultraviolet radiation.

Figure 2:
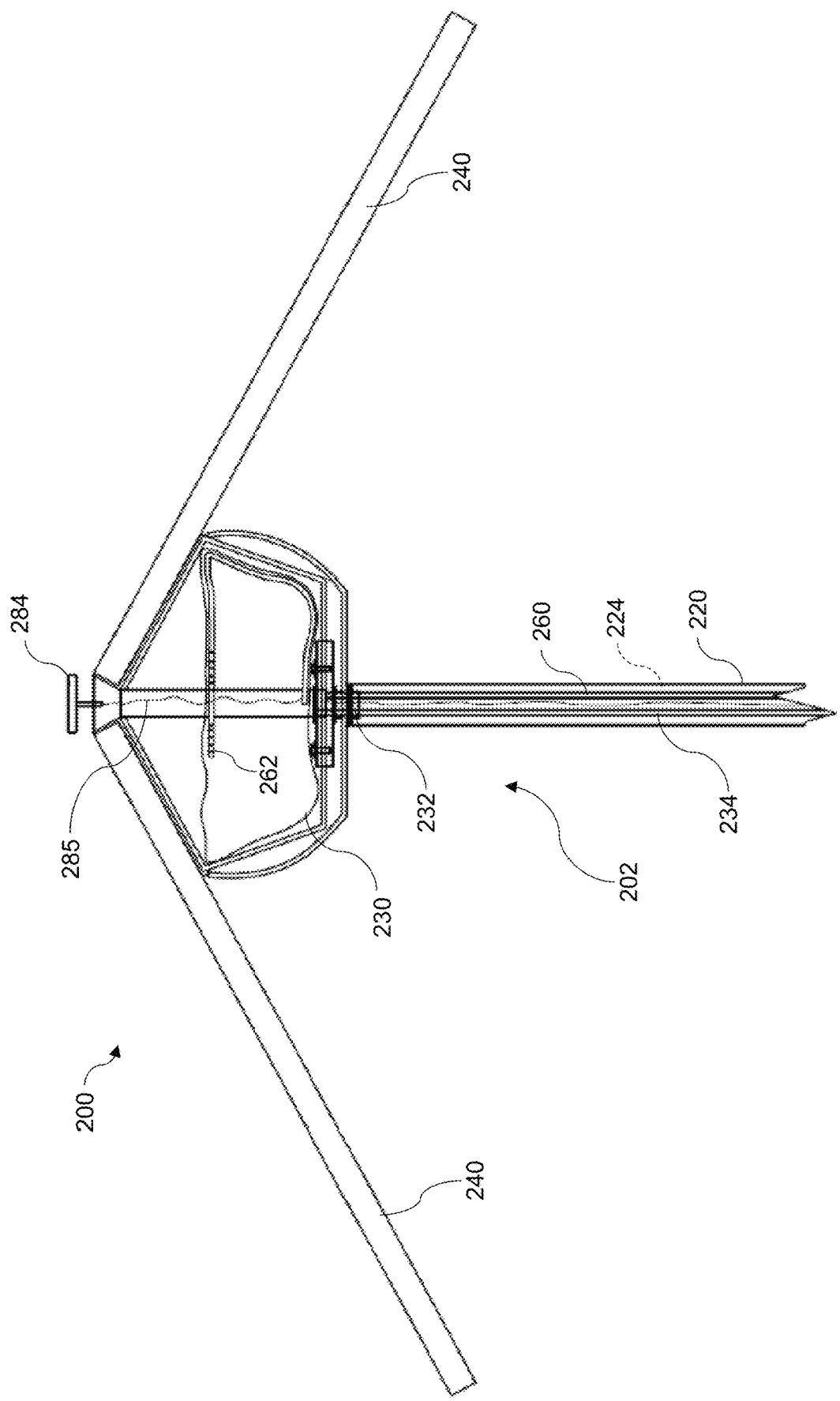
FIG. 2 illustrates a close-up view of a top end of an apparatus for providing a vegetated canopy, in accordance with a representative embodiment.

FIG. 2 illustrates a close-up view of a top end of an apparatus for providing a vegetated canopy, in accordance with a representative embodiment.

The apparatus 200 of FIG. 2 may be the same or similar to that shown above, e.g., for an embodiment that includes an umbrella-like structure. Specifically, the figure shows a close-up view of the top end of a structural frame 202.

FIG. 2 clearly shows the post 220, the pathway or hollow core 224, the soil container 230, the drain 232, the drain line 234, the ribs 240, the supply line 260, the dispensing mechanism 262, the solar panel 284, and wiring 285 for powering components or charging a battery or the like.

Figure 3:
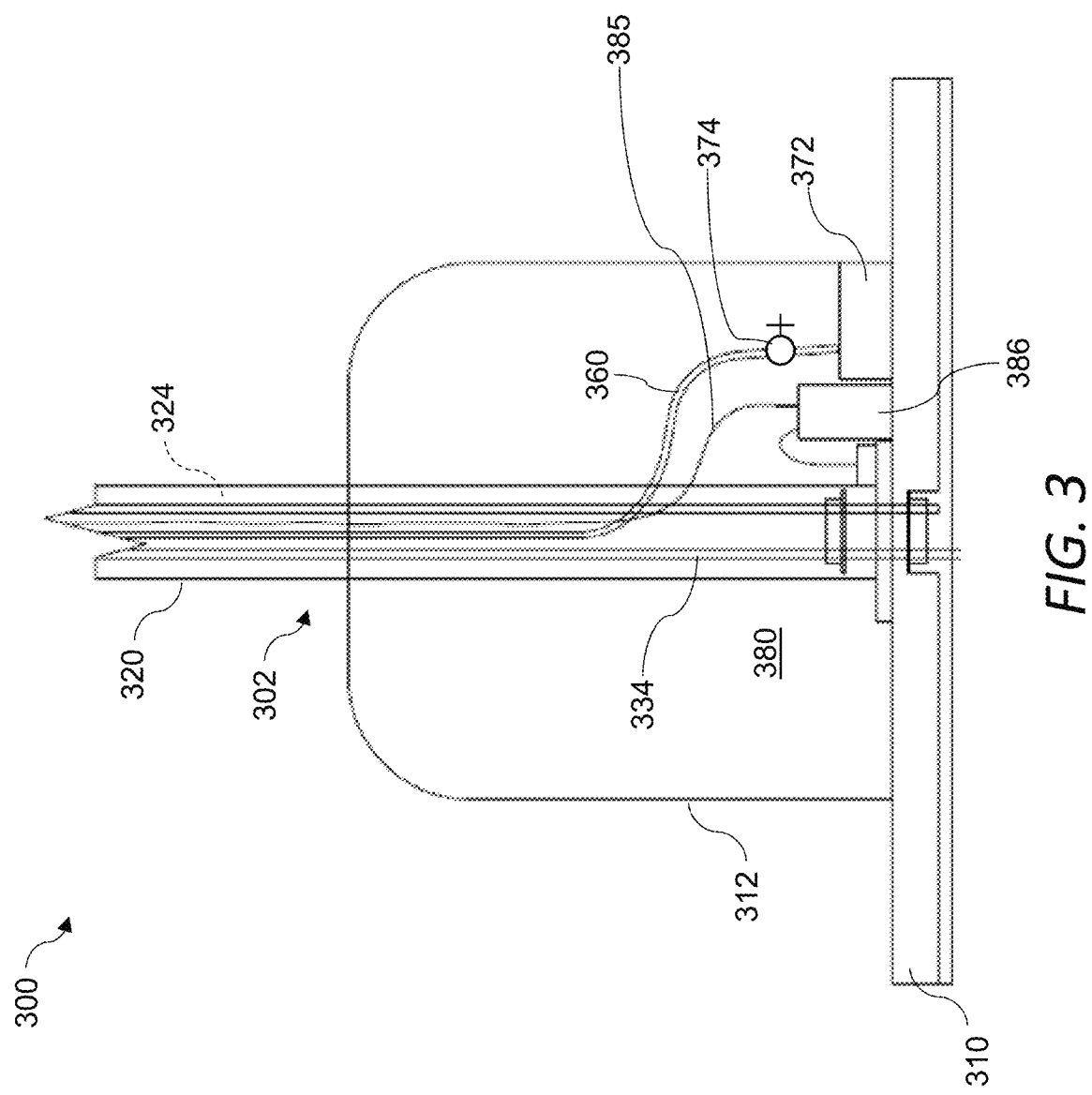
FIG. 3 illustrates a close-up view of a bottom end of an apparatus for providing a vegetated canopy, in accordance with a representative embodiment.

FIG. 3 illustrates a close-up view of a bottom end of an apparatus for providing a vegetated canopy, in accordance with a representative embodiment.

The apparatus 300 of FIG. 3 may be the same or similar to that shown in the figures above, e.g., for an embodiment that includes an umbrella-like structure. Specifically, the figure shows a close-up view of the bottom end of a structural frame 302.

FIG. 3 clearly shows the base 310, the housing 312 (e.g., a casing or the like that houses various electronics and/or a water reservoir 380), the post 320, the pathway or hollow core 324, the drain line 334, the supply line 360, the pump 372, the valve 374, a power source 386 (e.g., a battery, which may also or instead be charged by a power source such as the sun through the use of a solar panel or the like), and associated wiring 385.

Figure 4:
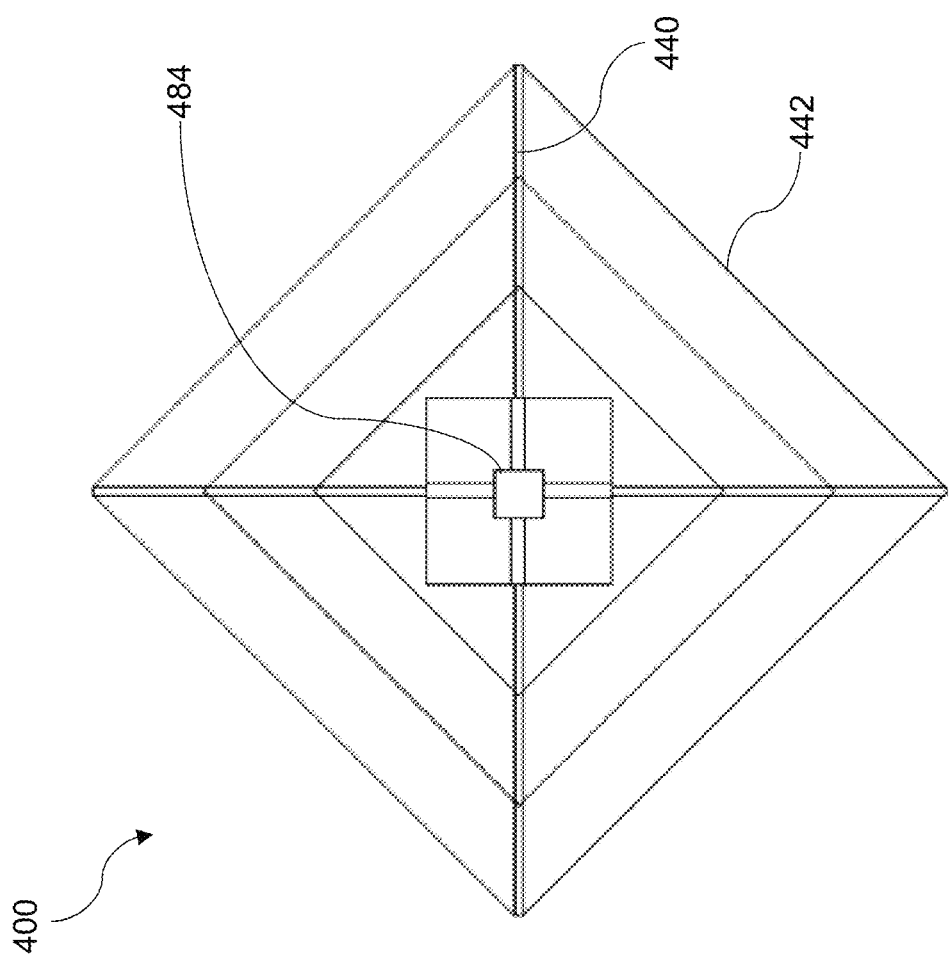
FIG. 4 illustrates a top view of an apparatus for providing a vegetated canopy, in accordance with a representative embodiment.

FIG. 4 illustrates a top view of an apparatus for providing a vegetated canopy, in accordance with a representative embodiment. The apparatus 400 may include a top end of an umbrella or the like that is structurally configured to support one or more living canopies thereon.

As shown in the figure, the apparatus 400 may include one or more ribs 440 structurally configured to support one or more vegetated canopies disposed thereon.

In an implementation, the apparatus 400 may include one or more connecting members 442 disposed along a length of one or more of the ribs 440 and attaching at least one of the ribs 440 to another one of the ribs 440. The ribs 440 and the one or more connecting members 442 may form a trellis structurally configured to support vegetation. For example, in an implementation, vegetation may be placed directly on the ribs 440 and the one or more connecting members 442. In another implementation, one or more modular vegetated canopies may be placed onto the ribs 440 and/or the one or more connecting members 442, where the ribs 440 and/or the one or more connecting members 442 are structurally configured for engagement with modular vegetated canopies.

FIG. 4 also clearly shows a solar panel 484 or the like, which may be disposed on the top end of the apparatus 400.

Figure 5:
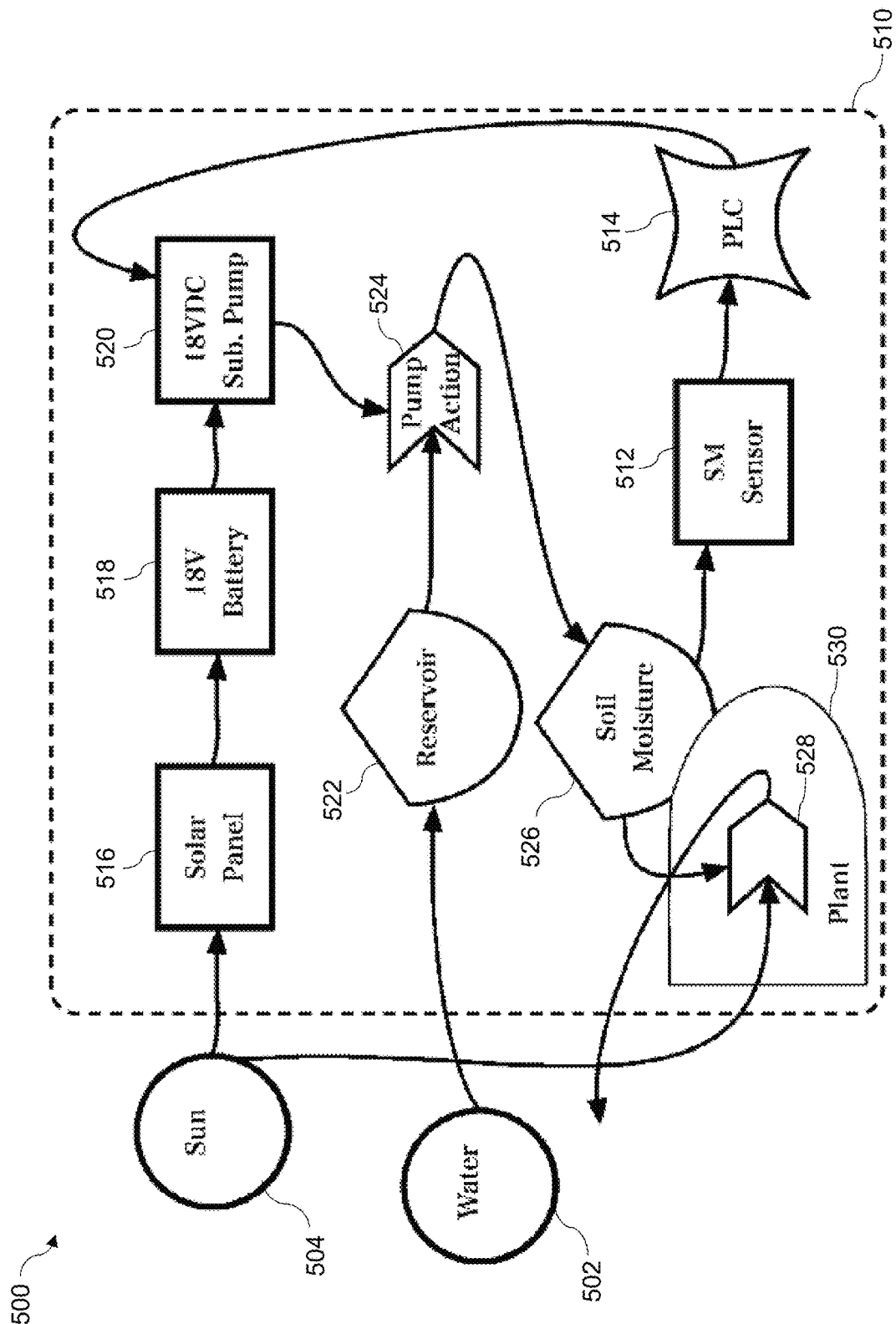
FIG. 5 illustrates a block diagram of an irrigation system, in accordance with a representative embodiment.

FIG. 5 illustrates a block diagram of an irrigation system, in accordance with a representative embodiment. In general, the block diagram outlines an irrigation method 500 using an irrigation system 510, e.g., a 'smart' irrigation system, such as that described above.

The irrigation system 510 may include one or more sensors 512, e.g., such as a soil moisture sensor ("SM Sensor" as shown in the figure) and/or a thermistor. The irrigation system 510 may further include a controller 514, e.g., a programmable micro-controller or programmable logic controller ("PLC" as shown in the figure), or any of the controllers described herein or otherwise known in the art. The irrigation system 510 may further include a solar panel 516 (e.g., a photovoltaic panel), a rechargeable battery 518 ("18V Battery" as shown in the figure; other voltages are also possible), a water pump 520 ("18VDC Sub. Pump" as shown in the figure; other pumps/voltages are also possible), wiring, water supply tubing and nozzles, as well as a drain and drainage tubing.

The irrigation system 510 may use one or more of soil moisture and temperature measurements to control the water pump 520. For example, an algorithm included on the controller 514 may turn the water pump 520 on and off (or otherwise control the flow of water 502, e.g., as supplied from a reservoir 522 or other water source such as a hose or hose bibb) to supply water 502 in an amount needed to achieve desired conditions for plant health and maintenance. In this manner, the irrigation system 510 may reduce the demand for manual watering. Accordingly, an operator may only need to fill the water reservoir 522 periodically. The water reservoir 522 may also or instead be filled naturally, e.g., by rain water or condensate.

As shown in the figure, the irrigation method 500 may include creating a desired flow of water 502 from the water reservoir 522 or other water source through pump action 524 created by the water pump 520. The water pump 520 may be activated by the controller 514 based on a sensed parameter of the plant 528 using the sensor 512, e.g., based on a soil moisture level 526 of soil included in a soil container 530. The irrigation system 510 may be powered by the sun 504 using a solar panel 516 or the like. In this manner, the irrigation system 510 may be relatively self-sufficient, e.g., without a need for external power.

Thus, as described herein, a 'smart' irrigation system may include a soil moisture sensor, a thermistor, a programmable micro-controller, a photovoltaic panel, a rechargeable battery, a water pump, wiring, water supply tubing and nozzles, a drain, and drainage tubing. Plants use water during transpiration as a means to control the temperature of their leaves and to extract nutrition from soil water. Transpiration is driven by the atmospheric vapor pressure, soil water availability, temperature, and solar radiation. Controlling the availability of soil moisture can help control the growth of a plant and its ability to transpire, which in turn affects its capacity for evaporative cooling. Different species have different growth responses to soil moisture. Controlling soil moisture within an acceptable range can promote the growth and health of a plant. In commercial plant nurseries, irrigation rates often err on the side of overwatering to promote maximum growth. The potential harmfulness of overwatering can be reduced by including built-in drainage at the bottom of growing containers. However, this is practice is not necessarily 'smart' irrigation, and can lead to the wasting of potable water. 'Smart' irrigation, on the other hand, may supply a plant with the right amount of water to meet its demands for maintaining health. Thus, an ingredient for 'smart' irrigation may be to irrigate a plant based on the existing and optimal soil water content. During plant transpiration, soil water content decreases. When it falls below a threshold, the plant may become stressed. Irrigation may be used to raise the soil water content to a targeted level. However, raising the soil water above the targeted level can lead to saturated soil that harms the plant. Thus, 'smart' irrigation should maintain soil water content within a given range, which can vary by species.

Thus, an irrigation system 510 as described herein may use an algorithm that implements the irrigation method 500 shown in FIG. 5. The algorithm may thus determine the amount of irrigation water to add to the soil container at various times throughout the day.

An irrigation algorithm may reside within a micro-controller, which receives analog signals on the soil moisture and temperature from sensors or probes located in the soil container. Based on the algorithm, the microcontroller may send digital signals to the pump to be turned on and off, or otherwise to control a flow rate of water. The pump may be electrically driven by a rechargeable battery located in a base housing or the like. The battery may be electrically charged by a solar photovoltaic panel located above the canopy and soil container. Solar electricity may be conducted to the battery via wires, e.g., located in a conduit inside the post.

Figure 6:
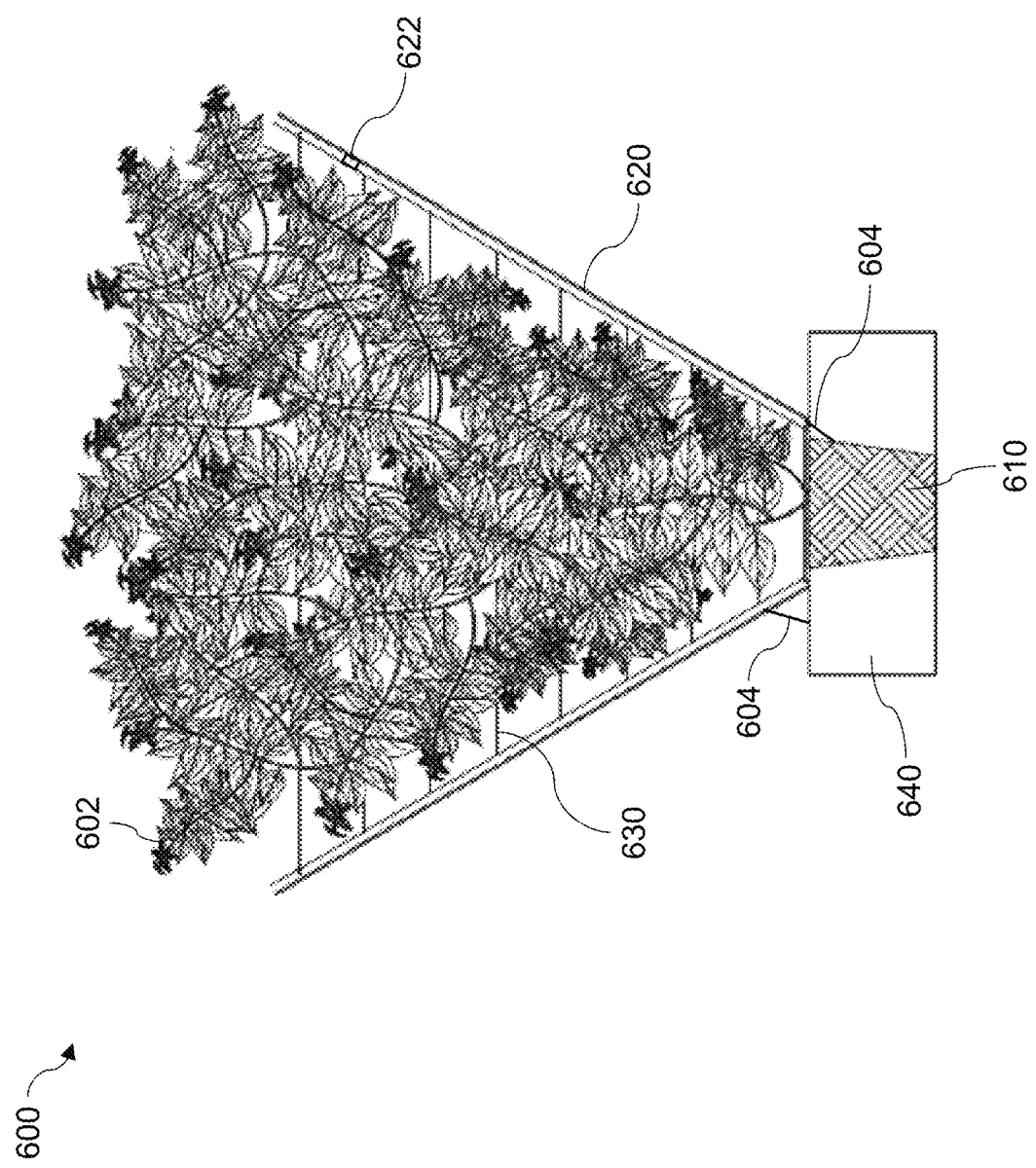
FIG. 6 illustrates a modular vegetated canopy, in accordance with a representative embodiment.

FIG. 6 illustrates a modular vegetated canopy, in accordance with a representative embodiment. The modular vegetated canopy 600 may be structurally configured to be placed in a cooperative arrangement with a support structure, such as any of the support structures described herein, e.g., an umbrella, an awning, a tent, a shade, a waiting area, a sitting area, a pergola, a canopy tent, and the like. The modular vegetated canopy 600 may be attached in a horizontal arrangement on a support structure, a vertical arrangement, or at various angles there between. It may also or instead be possible to attach a modular vegetated canopy 600 upside-down on a support structure, i.e., on the underside of a support structure.

In general, the modular vegetated canopy 600 may be part of a modular plant trellis pod system for use with a support structure, such as any described herein (e.g., the 'living umbrella' described above with reference to FIG. 1). For example, the modular vegetated canopy 600 may include a plant trellis with an attached soil container 610 for pre-growing a canopy of live plants that can be easily installed on the ribs and chassis of the 'living umbrella' described above with reference to FIG. 1. The soil container 610 may be a typical size for growing a plant in a container. Substantially rigid external members 620 of the modular vegetated canopy 600 may support one or more metal cables, non-metal cords, strings, ropes, or other cable-type materials, which can act as the trellis where plants, such as vining plants and climbing plants, can attach as they grow. The same rigid external members 620 may act as rib-connectors such that the modular vegetated canopy 600 may can be attached to the ribs of the support structure, such as the 'living umbrella' described above with reference to FIG. 1. The soil container 610 (or "pod") may fit into a section of a bucket or other receiver of the support structure. The support structure and modular vegetated canopy 600 may be designed to have the same number of sections. In implementations, rib-connectors may include fasteners or the like that can be tightened or released to enable the addition or removal of the modular vegetated canopy 600 from the support structure.

The modular vegetated canopy 600 may allow for easy exchange of the plant canopy on the supporting structure. Such exchange may occur when a user desires to have a new type of plant, when a plant fails, at the end of the growing season, at the beginning of the growing season, and the like. The modular vegetated canopy 600 may also or instead be used to pre-grow a plant on the trellis so that a full canopy can be added to the supporting structure at a desired time, such as the beginning of the season, when a plant fails, when an owner wants a new type of plant, and the like.

As described herein, a modular vegetated canopy 600 may include a soil container 610, one or more external members 620 (e.g., a plurality of substantially rigid external members 620), and one or more connecting members 630.

The soil container 610 may be structurally configured to engage with a soil container support formed on a support structure. By way of example, the soil container 610 shown in FIG. 6 may be structurally configured to engage with the soil container 130 in FIG. 1, where the soil container 130 in FIG. 1 can be thought of as more of a structure for supporting and/or aligning a soil container 610 such as that shown in FIG. 6. For example, the soil container 610 may be sized and shaped to fit within the soil container support in a predetermined configuration.

The soil container 610 may vary in size, e.g., depending on the dimensions of the trellis. The dimensions soil container 610 may be typical of soil potting containers used in the nursery plant trade. For example, in implementations, the soil container 610 may include a capacity between about one and twenty gallons. The soil container 610 may otherwise generally be sized and shaped to contain soil and plant roots.

The one or more external members 620 (e.g., a plurality of substantially rigid external members 620) may extend from the soil container 610, an anchoring structure 640, or the like adjacent to or cooperating with the soil container 610. In an implementation, once the vegetated canopy 600 is connected to a support structure, the external members 620 may no longer be physically attached to the soil container 610 or the like, but rather the external members 620 may be solely connected to the ribs of the support structure. As the name suggests, the external members 620 may be disposed on the perimeter of the modular vegetated canopy 600. For example, a modular vegetated canopy 600 may include two external members 620 extending from the edges of the soil container 610 or anchoring structure 640. However, in implementations, one or more external members 620 may also or instead be disposed within the perimeter of the overall modular vegetated canopy 600. Thus, the term "external" when used to describe the external members 620 may be a word of convenience, and not necessarily meant to limit the external members 620 to a position on the perimeter of the modular vegetated canopy 600. For example, a modular vegetated canopy 600 may include three external members 620, with two extending from the edges/perimeter of the soil container 610 or an anchoring structure 640, and one extending from a central portion (interior portion) of the soil container 610 or an anchoring structure 640. Other configurations are possible as will be readily apparent based on this disclosure.

One or more of the substantially rigid external members 620 may be structurally configured to engage with one or more ribs formed on a support structure, such as the ribs 140 as described with reference to FIG. 1. To this end, each of the plurality of substantially rigid external members 620 may be sized and shaped to fit onto one or more ribs formed on the support structure in a predetermined configuration. For example, an external member 620 may include a channel or the like for receiving a rib of the support structure within the channel. An external member 620 may instead simply fit on top of a rib of the support structure. Each of the plurality of substantially rigid external members 620 may instead be sized and shaped to fit within the one or more ribs formed on the support structure in a predetermined configuration. For example, a rib may include a channel or the like for receiving an external member 620 within the channel. The engagement between the one or more ribs formed on the support structure and the external member 620 may be a snap-fit connection, friction fit connection, or similar.

In implementations, each of the plurality of substantially rigid external members 620 may include one or more engagement features 622 structurally configured to cooperate with corresponding engagement features disposed on the support structure, e.g., to align the plurality of substantially rigid external members 620 in one or more predetermined configurations on the support structure. The one or more engagement features 622 may include a fastener that can be adjusted for tightening, loosening, or releasing a substantially rigid external member 620 from a rib formed on the support structure. The fastener may include without limitation one or more of a bolt, a clamp, a clip, a dowel, a hook and loop connector, a nail, a nut, a pin, a screw, a slider, and the like.

The one or more engagement features 622 may also or instead include a first hole on each of the plurality of substantially rigid external members 620 that aligns with a second hole disposed on the support structure, e.g., on a rib of the support structure. In such an implementation, a fastener or the like (such as those described above) may be disposed through each of the first hole and the second hole to secure one or more substantially rigid external members 620 to the support structure. The one or more engagement features 622 may also or instead include one or more of protrusions, depressions, and holes, e.g., formed on one or more of the external members 620 and the ribs of the support structure. For example, an external member 620 may include a protrusion and a rib of the support structure may include a corresponding/cooperating depression or hole (or vice-versa), where the protrusion fits into the depression or hole.

The predetermined configuration of the external members 620 on the ribs of the support structure may ensure a correct or desired alignment of the modular vegetated canopy 600 on the support structure. A plurality of configurations may be possible, e.g., such that a plurality of modular vegetated canopies 600 can fit onto a support structure in a variety of patterns, shapes, and so on. In this manner, the modular vegetated canopies 600 may fit onto a support structure like puzzle pieces, e.g., to fill gaps or to leave gaps where such gaps may be desired.

The plurality of substantially rigid external members 620 may include one or more of aluminum, steel, plastic, bamboo, wood, and the like.

Each of the plurality of substantially rigid external members 620 may include a cross-section of about 0.5 to 3 inches, and a length of about 48 to 72 inches. For example, the external members 620 may include a length of about 50 inches. In an implementation, the external members 620 are spaced apart at their widest point by about 53.50 inches.

The one or more connecting members 630 may be disposed along a length of one or more of the plurality of substantially rigid external members 620. For example, each of the connecting members 630 may be equally spaced from one another along the length of an external member 620.

The one or more connecting members 630 may attach at least one of the plurality of substantially rigid external members 620 to another one of the plurality of substantially rigid external members 620. As shown in the figure, the plurality of substantially rigid external members 620 and the one or more connecting members 630 may thereby form a trellis structurally configured to support vegetation 602 thereon.

The one or more connecting members 630 may include one or more of a cable, a cord, a string, a rope, a monofilament (e.g., fishing line or the like), and the like. In an implementation, a connecting member 630 includes a metal material. For example, the connecting member 630 may include a stainless steel material. In an implementation, a connecting member 630 includes a non-metal material. For example, the connecting member 630 may include one or more of cotton, jute, nylon, hemp, and the like.

Each of the connecting members 630 may include a cross-section of about 1/32 to 1/4 inches.

The modular vegetated canopy 600 may include one or more stakes 604 or the like attached to the soil container 610 or an anchoring structure 640 or the like adjacent to or cooperating with the soil container 610. The stakes 604 may be structurally configured to engage with the plurality of substantially rigid external members 620 thereby aligning the plurality of substantially rigid external members 620 in a predetermined configuration relative to the soil container 610 or the anchoring structure 640. The stakes 604 may also or instead be inserted into the soil container 610 in an embodiment. The stakes 604 may be made from a metal material or the like.

The modular vegetated canopy 600 may include an anchoring structure 640 adjacent to or cooperating with the soil container 610. In an implementation, the external members 620 are connected to the anchoring structure 640. The anchoring structure 640 may include a support block or the like, which may be configured to hold the trellis upright or otherwise in a predetermined or desired configuration. The support block may be attached to each of the plurality of substantially rigid external members 620 and the soil container 610. The support block may be structurally configured to align the plurality of substantially rigid external members 620 in a predetermined configuration relative to the soil container 610. The support block may include one or more of wood, concrete (e.g., concrete block or cinder block), metal, and/or other materials. The dimensions of the anchoring structure 640 may be suitable to support the trellis. In an implementation, the anchoring structure 640 is about 9.00 inches deep and about 24.00 inches wide.

The overall shape of modular vegetated canopies 600 may vary. For example, although FIG. 6 shows a substantially triangular shape with the soil container 610 substantially disposed at the vertex of the substantially triangular shape, the modular vegetated canopies 600 may include other substantially polygonal or non-polygonal shapes including without limitation a substantially square shape, a substantially rectangular shape, a substantially curved shape (e.g., circular, elliptical, or otherwise), a substantially pentagonal shape, and so on and so forth. To obtain a substantially triangular shape, the external members 620 may be configured so that they project from the anchoring structure 640 or soil container 610 at angles of about 60 degrees. Other angles, e.g., acute angles, are possible.

As described above, a modular vegetated canopy 600 may include one or more vascular plants selected such that the vegetated canopy performs one or more of: absorbing direct and indirect ultraviolet radiation; reducing noise by absorbing sounds in wave frequencies audible to a human ear; providing shade by absorbing and reflecting direct and indirect solar radiation; absorbing heat via plant leaf transpiration; and removing volatile organic compounds via plant leaf gas exchange. For example, the modular vegetated canopy may include vegetation selected from one or more of the following plant species (which are provided by way of example and not of limitation): *antigonon leptopus, bauhinia corymbosa, bignonia capreolata, bougainvillea* sp., *callisia repens, campsis radicans, celastrus scandens, clematis* spp., *ficus pumil, gelsemium sempevirens, humulus lupulus, hydrangea anomala petiolaris, lonicera periclymenum, lonicera sempevirens, mandevilla, pandorea jasminoides, parthenociscus quinquefolia, passiflora incarnate, philodendron scandens, podranea ricasoliana, pseudocalymma alliaceum, pyrostegia venusta, quigualis indica, schizophragma integrilfolium* var. *faurei, vigna caracalla, vitis acerifolia, vitis blancoi, vitis bloodworthiana, vitis bourquiniana, vitis californica, vitis champini, vitis champinii, vitis cinerea, vitis coignetiae, vitis davidii, vitis doaniana, vitis ficifolia, vitis flexuosa, vitis girdiana, vitis jacquemontii, vitis labrusca, vitis monticola, vitis mustangensis, vitis nesbittiana, vitis novae-angliae, vitis palmate, vitis piasezkii, vitis popenoei, vitis riparia, vitis romanetii, vitis rotundifolia, vitis rupestris, vitis aestivalis, vitis amurensis, vitis andersonii, vitis arizonica, vitis berlandierixrupestris, vitis betulifolia, vitis biformis, vitis shuttleworthii, vitis slavinii, vitis tiliifolia, vitis treleasei, vitis vinifera, vitis vulpine, vitis wilsonae, wisteria frutescens*, and the like.

One of the advantages of a modular vegetated canopy 600 is that it may allow for a plant to be grown at a nursery prior to the modular vegetated canopy 600 being attached to a support structure. This may ensure that the support structure can be equipped with a fully grown plant canopy when it is placed into service at an establishment, e.g., a commercial establishment such as a restaurant. The modular vegetated canopies 600 may also allow for relatively easy removal and replacement of plant canopies on a support structure.

Figure 7:
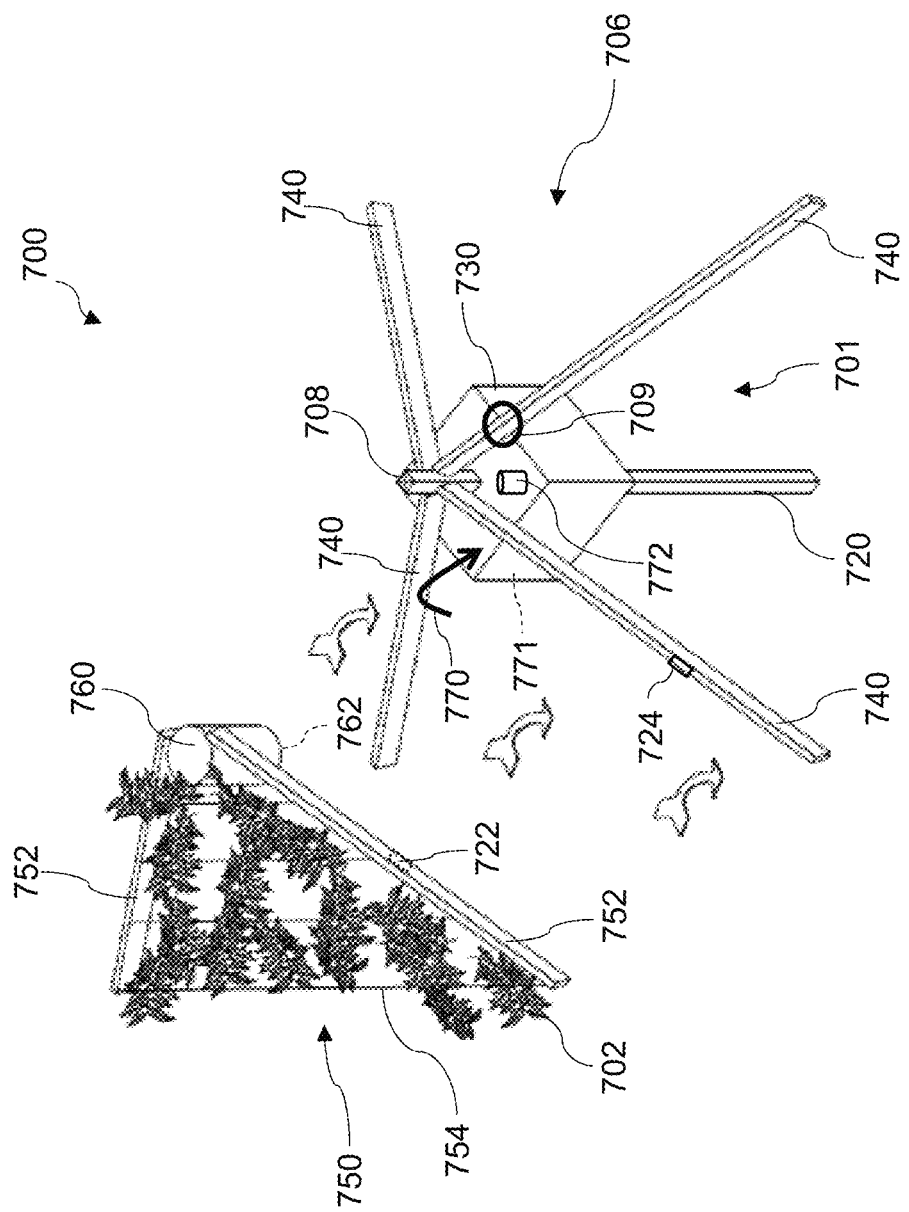
FIG. 7 illustrates a vegetated canopy system, in accordance with a representative embodiment.

FIG. 7 illustrates a vegetated canopy system, in accordance with a representative embodiment. In general, the vegetated canopy system 700 may include a support structure 701 and a modular canopy 750. Specifically, FIG. 7 illustrates how the modular canopy 750 may plug into/onto the support structure 701.

The vegetated canopy system 700 may be used for placing a canopy of live plants (e.g., the modular canopy 750) on a support structure 701. In general, external members 752 of a modular canopy 750 may align with ribs 740 of a support structure 701 so that these components can be attached for extended periods of time. The attachment may be reinforced using, e.g., corresponding screw holes or the like that align so that these components can be bolted together or otherwise secured with a fastener.

The support structure 701 may be sized and shaped for providing a vegetated canopy therein or thereon. As shown in the figure, the support structure 701 may be part of an umbrella or an umbrella-like structure. However, it will be understood that the support structure 701 may also or instead include other structures including without limitation an awning, a tent, a shade, a waiting area, a sitting area, a pergola, a canopy tent, and the like. Thus, unless explicitly stated to the contrary or otherwise clear from the context, the support structure 701 as described herein can be an umbrella-like structure or a non-umbrella structure.

As stated above, in an implementation, the support structure 701 may include an umbrella-like structure. In such an implementation, the support structure 701 may include a base disposed on a bottom end of the support structure 701 (although the base is not shown in this figure, FIG. 1 provides an example of a base 110). The support structure 701 may include a post 720 connected to the base, where the post 720 extends from the bottom end of the support structure 701 to a top end 706 of the support structure 701. The support structure 701 may include a soil container support 730 connected to the post 720 at the top end 706 of the support structure 701. The support structure 701 may include a plurality of ribs 740 projecting from the top end 706 of the support structure 701, where the plurality of ribs 740 are structurally configured to support one or more vegetated canopies disposed thereon—e.g., a modular canopy 750 disposed thereon.

As stated above, in an implementation, the support structure 701 may include a non-umbrella structure, such as an awning, a pergola, and the like. In such implementations, the support structure 701 may include a soil container support 730, and a plurality of ribs 740 disposed along the support structure 701, where the plurality of ribs 740 are structurally configured to support one or more vegetated canopies disposed thereon—e.g., a modular canopy 750 disposed thereon. Thus, the non-umbrella structure may lack a post 720 and/or a base. Alternatively, the post 720 may be the supports for an elevated structure that includes the soil container support 730 and plurality of ribs 740, e.g., the legs of a pergola.

As stated above, the vegetated canopy system 700 may include a modular canopy 750 for attachment to the support structure 701. The modular canopy 750 may include a soil container 760 structurally configured to engage with the soil container support 730 of the support structure 701. As shown in the figure, the soil container support 730 may include a structure that is configured to receive the soil container 760 therein or thereon. For example, the soil container support 730 may receive the soil container 760 in the location shown by arrow 770 in the figure. The soil container 760 may sit wholly or partially within a cavity 771 of a structure that forms the soil container 760 (e.g., the box-like structure shown in the figure). Additionally or alternatively, the soil container support 730 may include a projection 772 or the like that receives an opening 762 or the like included on the soil container 760. The projection 772 may be disposed on a surface of the soil container support 730 or within a cavity 771 of the soil container support 730. Alternatively, the soil container 760 itself may include such a projection or the like that cooperates with an opening, depression, or the like on the soil container support 730. As stated above and as shown in the figure, in an implementation, the soil container support 730 includes a cavity 771, where the soil container 760 fits within the cavity 771. The size and shape of the cavity 771 may cooperate with the size and shape of the soil container 760 in order to align and position the modular canopy 750 relative to the support structure 701. For example, the soil container support 730 may include a box-shaped opening that receives a box-shaped soil container 760. Other shapes are possible, where these shapes can dictate positioning of the modular canopy 750 relative to the support structure 701.

The modular canopy 750 may include a plurality of substantially rigid external members 752. Each of the plurality of substantially rigid external members 752 may be structurally configured to engage with at least one of the plurality of ribs 740 of the support structure 701. For example, each of the plurality of substantially rigid external members 752 may be sized and shaped to fit onto at least one of the plurality of ribs 740 of the support structure 701 in a predetermined configuration. Each of the plurality of substantially rigid external members 752 may also or instead be sized and shaped to fit within at least one of the plurality of ribs 740 of the support structure 701 in a predetermined configuration.

In implementations, each of the plurality of substantially rigid external members 752 includes one or more engagement features 722 structurally configured to cooperate with corresponding engagement features 724 disposed on the plurality of ribs 740 of the support structure 701 to align the plurality of substantially rigid external members 752 in predetermined configurations on the support structure 701. The engagement features 722, 724 may include a first hole on each of the plurality of substantially rigid external members 752 that aligns with a second hole disposed on at least one of the plurality of ribs 740 of the support structure 701. A fastener or the like may be disposed through each of the first hole and the second hole to secure one or more substantially rigid external members 752 to the support structure 701. The engagement features 722, 724 may also or instead include one or more of protrusions, depressions, and holes.

The modular canopy 750 may include one or more connecting members 754 disposed along a length of one or more of the plurality of substantially rigid external members 752 and attaching at least one of the plurality of substantially rigid external members 752 to another one of the plurality of substantially rigid external members 752. The plurality of substantially rigid external members 752 and the one or more connecting members 754 may thereby form a trellis, where the trellis is structurally configured to support vegetation 702.

Similar to the embodiment described above with reference to FIG. 1, the post 720 may include a pathway formed therein or thereon.

The vegetated canopy system 700 may include a supply line as described herein. The supply line may be disposed in the pathway of the post 720 from the bottom end of the support structure 701 to the top end 706 of the support structure 701, e.g., to provide one or more of water and nutrients from the bottom end of the support structure 701 to the top end 706 of the support structure 701. Thus, the supply line may provide water and/or nutrients to one or more of the soil container 760 and vegetation 702 included on the modular canopy 750.

In implementations, the supply line may be in fluid communication with a pump and a reservoir containing water. The supply line may also or instead be in fluid communication with at least one of a hose and a hose bibb.

The vegetated canopy system 700 may include an irrigation system as described herein. The irrigation system may include one or more of a pump and a valve connected to the supply line and structurally configured to control an amount of water and/or nutrients supplied through the supply line to one or more of the soil container 760 and vegetation 702 included on the modular canopy 750. The irrigation system may also or instead include a controller programmed to control operation of one or more of the pump and the valve, and a power supply electrically coupled to one or more of the pump, the valve, and the controller.

The irrigation system may also or instead include one or more sensors. For example, the irrigation system may include a sensor configured to detect a moisture level in soil contained in the soil container 760, where the controller is configured to receive a first signal from the sensor and to control operation of one or more of the pump and the valve in response to the first signal. The irrigation system may also or instead include a second sensor configured to detect a thermal property of one or more of soil contained in the soil container 760 and vegetation 702 included on the modular canopy 750, where the controller is configured to receive a second signal from the second sensor and to control operation of one or more of the pump and the valve in response to at least one of the first signal and the second signal.

The controller of the irrigation system may be programmed to control an amount of water and/or nutrients supplied to at least one of the soil container 760 (e.g., soil included in the soil container 760) and vegetation 702 included on the modular canopy 750. The amount of water and/or nutrients supplied to the soil container 760 and/or vegetation 702 included on the modular canopy 750 may be based on one or more of a predetermined time interval or a predetermined schedule. For example, water may be supplied at certain times throughout a predetermined time period, e.g., certain times throughout the day, throughout the night, or throughout other specified time periods. Water may also or instead be supplied at other time intervals, which can be based on weather, climate, season, location, and so forth. Thus, the amount of water and/or nutrients supplied to the soil container 760 and/or vegetation 702 included on the modular canopy 750 may be based on a schedule, which can be set by a user, and which can vary depending upon certain factors/parameters.

The power supply of the irrigation system may include a photovoltaic panel and a rechargeable battery. For example, the photovoltaic panel may be disposed on the top end of the support structure 701 and electrically coupled to the rechargeable battery to charge the rechargeable battery.

The irrigation system and/or the supply line may include one or more of a soaker hose and a drip irrigation tube disposed in the soil container 760 and connected to the supply line.

One or more of the soil container 760 and the soil container support 730 may include a drain in communication with a pathway included in the post 720, where the drain is structurally configured to drain excess water from the soil container 760 through the pathway.

The vegetated canopy system 700 may include a mechanism for raising and lowering the ribs 740 of the support structure 701, e.g., in an embodiment where the support structure 701 includes an umbrella or the like. The mechanism may include a locking feature (e.g., disposed on a vertex 708 or other finial or sub-finial structure disposed at the top end 706 of the support structure 701) for securing the ribs 740 in place, and a hinge for the ribs 740 to pivot/swivel between a raised and a lowered position. The hinge may be disposed in an area 709 where the ribs 740 and the soil container support 730 meet, e.g., along a rim of the soil container support 730. In an implementation, the locking feature may include a spring lock, an actuator, a slider, a clip, or the like, where the locking feature secures the ribs 740 in place when in a raised position, and where the locking feature can be activated by a trigger that releases the locking feature. The trigger may be activated by a cable or the like attached to the locking feature, e.g., where the cable runs through the rib 740 or the post 720.

FIGS. 8-11 illustrate various vegetated canopy systems, in accordance with representative embodiments. As explained throughout this disclosure, the vegetated canopy systems may include a vegetated canopy (e.g., a modular vegetated canopy) engaged with a support structure that may take many different forms. FIGS. 8-11 illustrate various examples.

Figure 8:
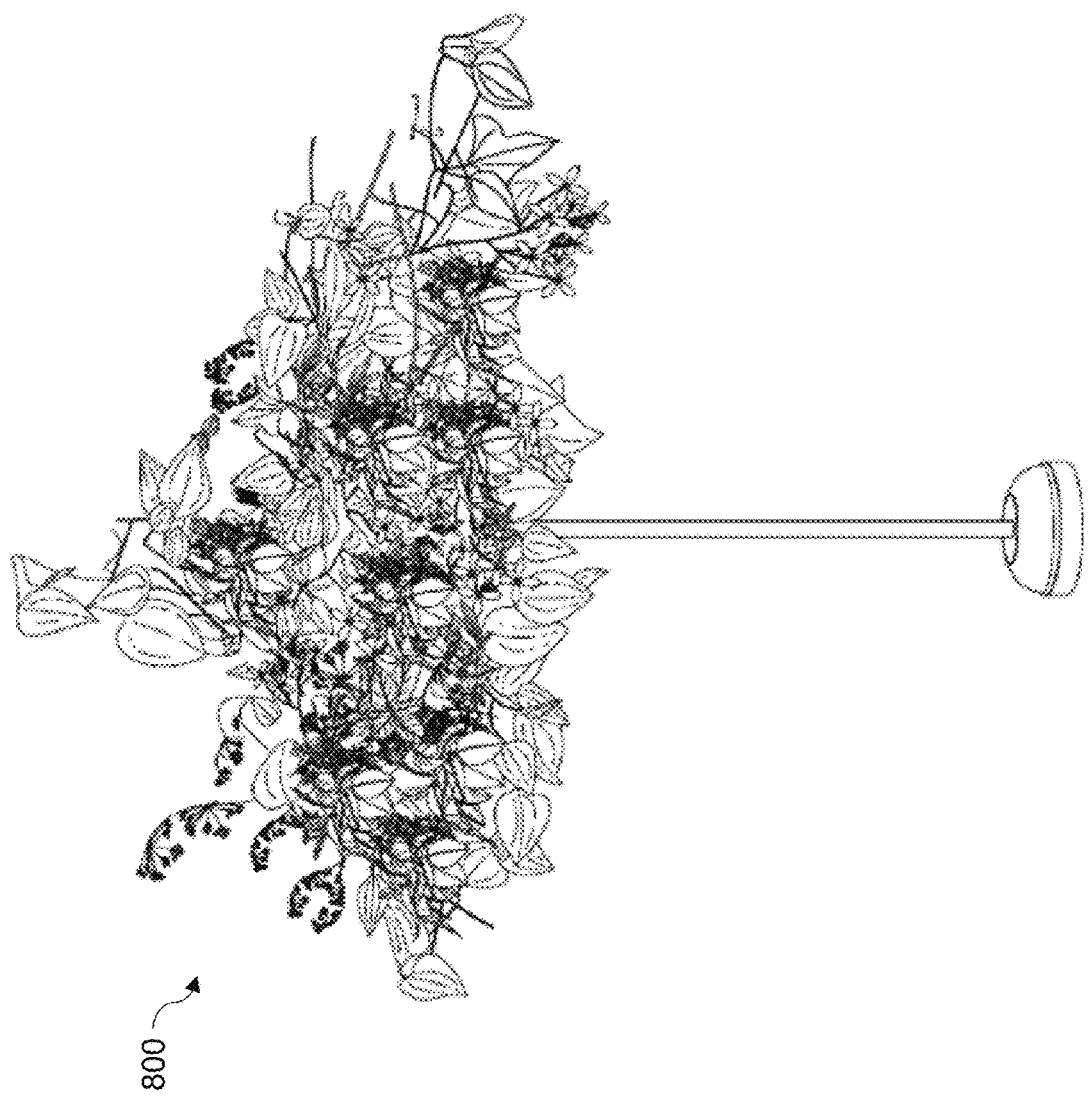
FIGS. 8-11 illustrate various vegetated canopy systems, in accordance with representative embodiments.

As shown in FIG. 8, the vegetated canopy system 800 may include a support structure in the form of an umbrella or the like.

Figure 9:
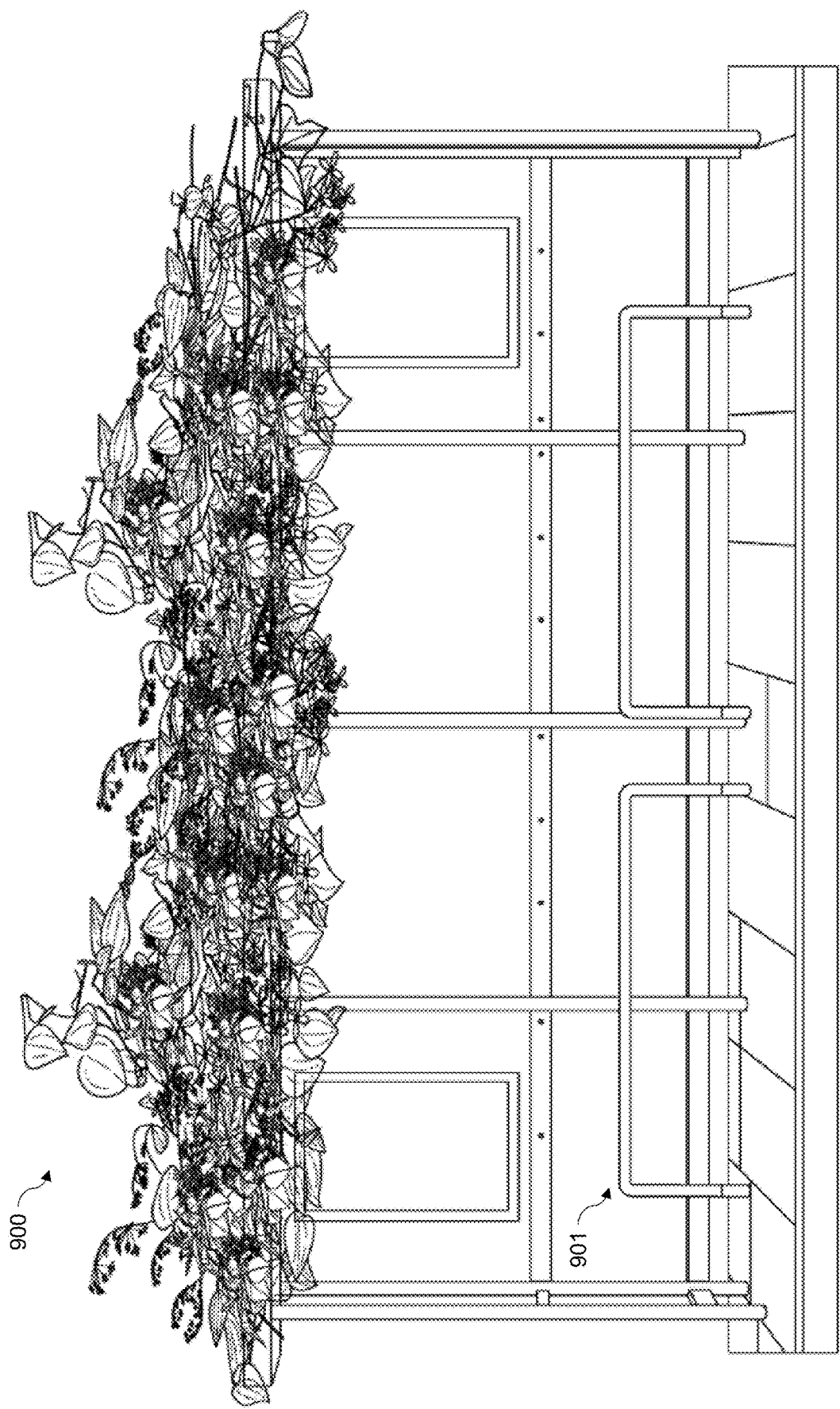

As shown in FIG. 9, the vegetated canopy system 900 may include a support structure in the form of an awning or the like, e.g., covering a seating area 901 or the like.

Figure 10:
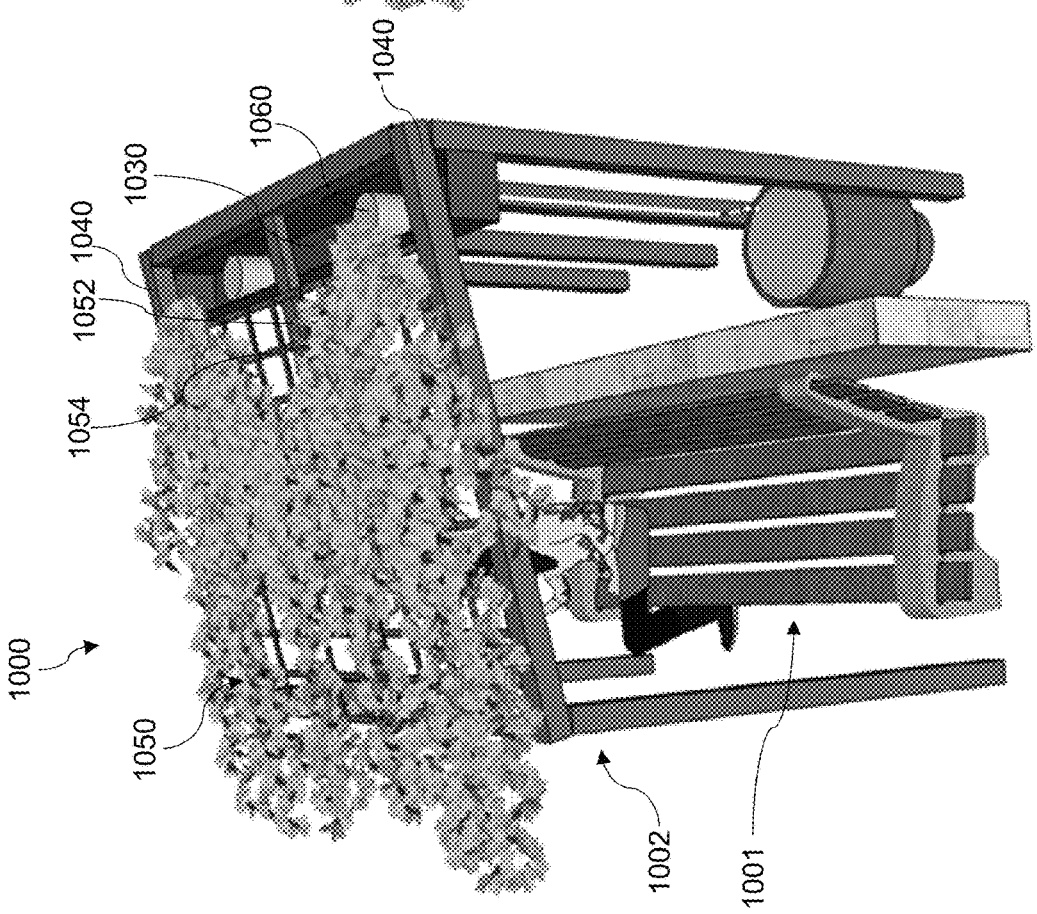

As shown in FIG. 10, the vegetated canopy system 1000 may include a support structure in the form of a freestanding covering or the like, e.g., covering a seating area 1001 or waiting area such as a bus stop or the like.

As shown in FIG. 10 the vegetated canopy system 1000 may include a support structure 1002 for providing a vegetated canopy, where the support structure 1002 includes a soil container support 1030 and a plurality of ribs 1040 disposed along the support structure 1002. The plurality of ribs 1040 may be structurally configured to support one or more vegetated canopies disposed thereon.

The vegetated canopy system 1000 may further include one or more modular canopies 1050 structurally configured to attach to the support structure 1002. The modular canopy 1050 may include a soil container 1060 structurally configured to engage with the soil container support 1030 of the support structure 1002. The modular canopy 1050 may also include a plurality of substantially rigid external members 1052, where one or more of the plurality of substantially rigid external members 1052 is structurally configured to engage with one or more of the plurality of ribs 1040 of the support structure 1002. The modular canopy 1050 may further include one or more connecting members 1054 disposed along a length of one or more of the plurality of substantially rigid external members 1052 and attaching at least one of the plurality of substantially rigid external members 1052 to another one of the plurality of substantially rigid external members 1052, where the plurality of substantially rigid external members 1052 and the one or more connecting members 1054 thereby form a trellis structurally configured to support vegetation thereon.

Figure 11:
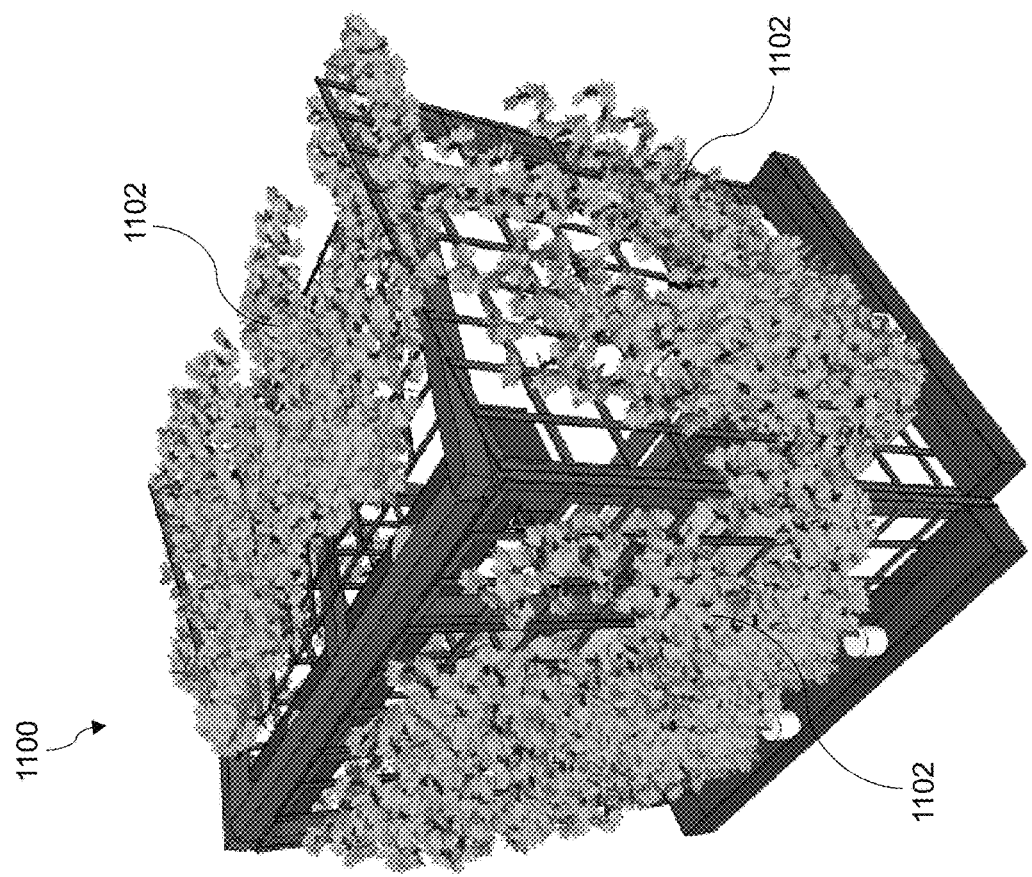

As shown in FIG. 11, the vegetated canopy system 1100 may include a support structure in the form of a freestanding covering or the like. As shown in this figure, modular vegetated canopies 1102 may be disposed on top of the support structure, and/or on the sides of the support structure.

Similar to the example embodiment described above in FIG. 1, the embodiments shown in FIGS. 8-11 may include features for making the vegetated canopy systems self-contained. For example, similar to the embodiment of FIG. 1, the various vegetated canopy systems included in FIGS. 8-11 may each include a structural frame comprising a soil container disposed at a first end of the structural frame, where the soil container is in communication with a pathway, and a plurality of ribs projecting from the first end of the structural frame, where the plurality of ribs are structurally configured to support one or more vegetated canopies disposed thereon. The various vegetated canopy systems included in FIGS. 8-11 may also or instead include a supply line disposed in the pathway to provide one or more of water and nutrients to at least one of soil contained in the soil container and a vegetated canopy disposed on the structural frame. The various vegetated canopy systems included in FIGS. 8-11 may also or instead include an irrigation system comprising one or more of a pump and a valve connected to the supply line and structurally configured to control an amount of water and/or nutrients supplied through the supply line to at least one of soil contained in the soil container and a vegetated canopy disposed on the structural frame. The various vegetated canopy systems included in FIGS. 8-11 may also or instead include a controller programmed to control operation of one or more of the pump and the valve, and a power supply electrically coupled to one or more of the pump, the valve, and the controller. The various vegetated canopy systems included in FIGS. 8-11 may also include a sensor configured to detect a moisture level in soil contained in the soil container, where the controller is configured to receive a first signal from the sensor and to control operation of one or more of the pump and the valve in response to the first signal. The various vegetated canopy systems included in FIGS. 8-11 may further include a second sensor configured to detect a thermal property of one or more of soil contained in the soil container and a vegetated canopy disposed on the structural frame, where the controller is configured to receive a second signal from the second sensor and to control operation of one or more of the pump and the valve in response to at least one of the first signal and the second signal. In the various vegetated canopy systems included in FIGS. 8-11, the controller may also or instead be programmed to control an amount of water and/or nutrients supplied to at least one of the soil container and a vegetated canopy disposed on the structural frame based on one or more of a predetermined time interval or a predetermined schedule.

Figure 12:
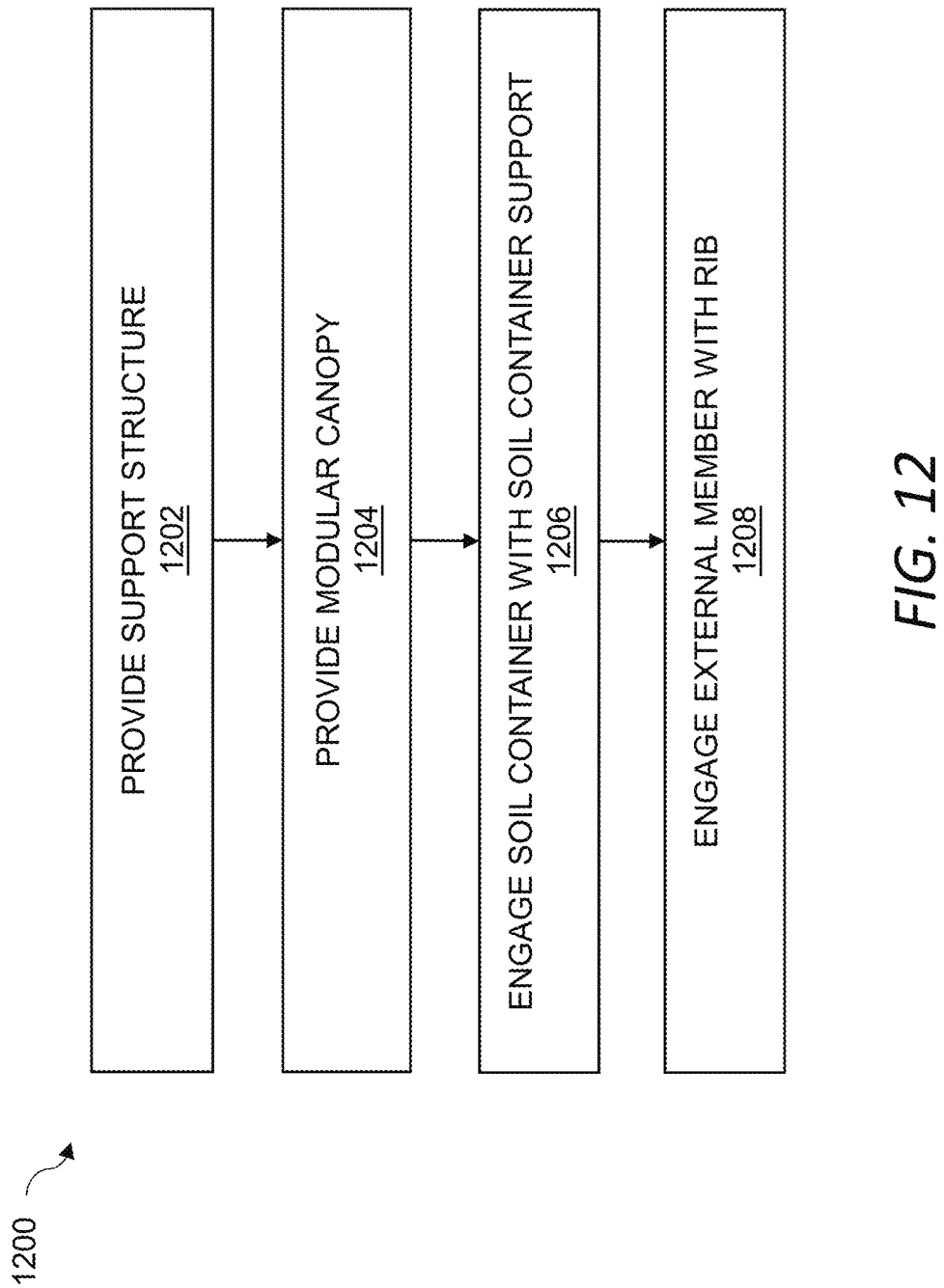
FIG. 12 illustrates a flow chart of a method for providing a vegetated canopy, in accordance with a representative embodiment.

FIG. 12 illustrates a flow chart of a method for providing a vegetated canopy, in accordance with a representative embodiment. In general, the method 1200 may include forming a vegetated canopy system through the cooperation of a modular canopy with a support structure. As described herein, the support structure may be one or more of a variety of structures including without limitation an umbrella, an awning, a tent, a shade, a pergola, a canopy tent, and the like.

As shown in block 1202, the method 1200 may include providing a support structure. The support structure may include a soil container support and a plurality of ribs disposed along the support structure.

As shown in block 1204, the method 1200 may include providing a modular canopy. The modular canopy may include a soil container, a plurality of substantially rigid external members, and one or more connecting members disposed along a length of one or more of the plurality of substantially rigid external members and attaching at least one of the plurality of substantially rigid external members to another one of the plurality of substantially rigid external members. The plurality of substantially rigid external members and the one or more connecting members may come together to form a trellis structurally configured to support vegetation.

As shown in block 1206, the method 1200 may include engaging the soil container of the modular canopy with the soil container support of the support structure.

As shown in block 1208, the method 1200 may include engaging at least one substantially rigid external member of the modular canopy with at least one rib of the support structure. Engagement of the soil container with the soil container support, and engagement of the at least one substantially rigid external member with the at least one rib, may thereby form a vegetated canopy system.

Figure 13:
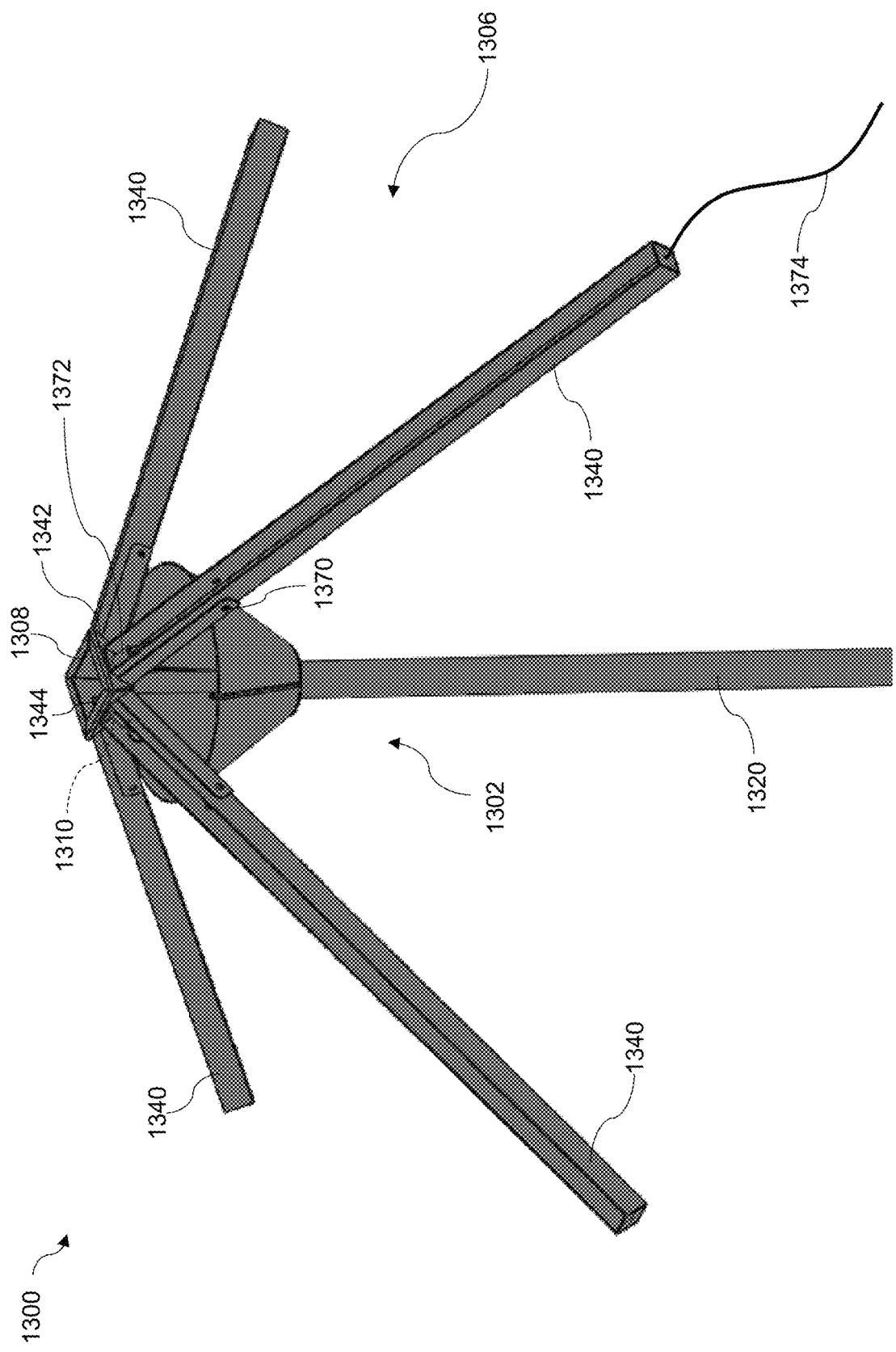
FIG. 13 illustrates a perspective view of a top end of an apparatus for providing a vegetated canopy, in accordance with a representative embodiment.

FIG. 13 illustrates a perspective view of a top end of an apparatus for providing a vegetated canopy, in accordance with a representative embodiment. The apparatus 1300 may be the same or similar to one or more examples shown and described above, e.g., where the support structure includes an umbrella or the like. FIG. 13 shows an example of how the ribs 1340 may be raised and lowered in an embodiment. To this end, the apparatus 1300 may include a mechanism for raising and lowering the ribs 1340. In general, the mechanism may include a locking feature for securing the ribs 1340 in place, and a hinge or the like for the ribs 1340 to pivot/swivel between a raised and a lowered position. For example, the mechanism may include a spring lock 1372 or the like, where the spring lock 1372 secures the ribs 1340 in place when in a raised position, and where the spring lock 1372 can be activated by a trigger that releases the spring included in the spring lock 1372 (e.g., by compressing the spring) to release the ribs 1340 for lowering the ribs 1340. The trigger may be activated by a pull cord 1374 or the like attached to the spring lock 1372, e.g., where the pull cord 1374 is threaded through the rib 1340 or the post 1320.

As shown in the figure, each rib 1340 in the plurality of ribs 1340 may be connected to the top end 1306 of the structural frame 1302 via a hinged connection 1370 that permits the plurality of ribs 1340 to be lowered and raised by a user. The hinged connection 1370 may include a pin or the like about which the rib 1340 can pivot. The hinged connection 1370 may be disposed at a rim of the soil container or adjacent thereto.

The apparatus 1300 may include a vertex 1308 disposed at the top end 1306 of the structural frame 1302. The vertex 1308 may generally include a structure formed at a convergent point of the ribs 1340 at the top end 1306 of the structural frame 1302. The vertex 1308 may include one or more apertures 1310 or cavities configured to receive a projection 1344 disposed on ends 1342 of the ribs 1340 for securing the ribs 1340 to the top end 1306 of the structural frame 1302. In an implementation, the projection 1344 is movable to release the ribs 1340 such that the ribs 1340 can be lowered via the hinged connection 1370. It is instead possible for apertures or cavities to be disposed on the ribs 1340, where the vertex 1308 includes movable projections.

The projection 1344 may be connected to a spring lock 1372 or the like. In an implementation, movement of the spring lock 1372 may move the projection 1344 into and out of engagement with the one or more apertures 1310 on the vertex 1308.

The apparatus 1300 may include a pull cord 1374 or the like, e.g., including at least one rope, cable, or chain secured to the spring lock 1372. In an implementation, pulling of the pull cord 1374 may activate the spring lock 1372 by compressing the spring to disengage the projection 1344 from the one or more apertures 1310 on the vertex 1308.

As shown in the figure, the vertex 1308 may include a polyhedral-type shape (e.g., a tetrahedron), where the number of surfaces/faces about an axis match the number of ribs 1340, and where each surface/face includes an aperture 1310 or cavity for receiving a projection 1344 of the rib 1340. However, the apparatus 1300 may also or instead include a clipping ring or the like (see, e.g., the ring 138 of FIG. 1), e.g., on the vertex 1308, on a soil container support, on a soil container, or otherwise disposed at the top end 1306 of the structural frame 1302. Such a clipping ring may lock the ribs 1340 into place. Further, although the vertex 1308 is shown as a convergence point/area for the ribs 1340, the vertex 1308 may also or instead include a finial structure or sub-finial structure of the apparatus 1300.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A system, comprising:
    a support structure for providing a vegetated canopy comprising:
        a base comprising one or more plates disposed on a bottom end of the support structure;
        a hollow post extending from the bottom end of the support structure to a top end of the support structure;
        a raised soil container support at the top end of the hollow post, said raised soil container support structurally configured with a cavity, a rim, and a drain, wherein the drain is aligned and in communication with the hollow post;
        a soil container structurally configured to fit wholly or partially within the cavity of the raised soil container support and engage with the raised soil container support; and
        a plurality of ribs connected to the top end of the support structure, the plurality of ribs structurally configured to affix to the rim of the raised soil container support, to extend radially about a central axis of the support structure, and to support one or more flexible connecting members between the ribs to form a trellis structurally configured to support vegetation as an elevated vegetated canopy,
        wherein each of the plurality of ribs has a length between about 42 and 72 inches and the support structure is in the form of an umbrella.

2. The system of claim 1, further comprising a supply line disposed in the hollow post and extending from a bottom end of the support structure to a top end of the support structure to provide one or more of water and nutrients from the bottom end of the support structure through the hollow post to the soil container, where the soil container is disposed in the cavity of the raised soil container support on the top end of the support structure.

3. The system of claim 2, further comprising an irrigation system comprising:
    one or more of a pump and a valve connected to the supply line and structurally configured to control an amount of one or more of water and nutrients supplied through the supply line to one or more of the soil container and vegetation;
    a controller operable to control operation of one or more of the pump and the valve; and
    a power supply electrically coupled to one or more of the pump, the valve, and the controller.

4. The system of claim 3, further comprising a sensor configured to detect a moisture level in soil contained in the soil container, where the controller is configured to receive a first signal from the sensor and to control operation of one or more of the pump and the valve in response to the first signal.

5. The system of claim 4, further comprising a second sensor configured to detect a thermal property of one or more of soil contained in the soil container and vegetation where the controller is configured to receive a second signal from the second sensor and to control operation of one or more of the pump and the valve in response to at least one of the first signal and the second signal.

6. The system of claim 3, where the controller is programmed to control an amount of one or more of water and nutrients supplied to at least one of the soil container and vegetation based on one or more of a predetermined time interval or a predetermined schedule.

7. The system of claim 3, where the power supply comprises a photovoltaic panel and a battery.

8. The system of claim 2, where the supply line provides one or more of water and nutrients to one or more of the soil container and vegetation.

9. The system of claim 2, where the supply line is in fluid communication with a pump and a reservoir containing water.

10. The system of claim 2, where the supply line is in fluid communication with at least one of a hose and a hose bibb.

11. The system of claim 2, further comprising one or more of a soaker hose and a drip irrigation tube disposed in the soil container and connected to the supply line.

12. The system of claim 1, further comprising:
a plurality of substantially rigid external members, where one or more of the plurality of substantially rigid external members is structurally configured to engage with one or more of the plurality of ribs of the support structure,
wherein the one or more flexible connecting members are disposed along a length of one or more of the plurality of substantially rigid external members and attach at least one of the plurality of substantially rigid external members to another one of the plurality of substantially rigid external members, the plurality of substantially rigid external members and the one or more flexible connecting members thereby forming a trellis structurally configured to support vegetation as an elevated vegetated canopy.

13. A system, comprising:
a support structure for providing a vegetated canopy comprising:
a base comprising one or more plates disposed on a bottom end of the support structure;
a hollow post attached to the base by a cylindrical receiver that extends vertically from the base, the hollow post extending from the bottom end of the support structure to a top end of the support structure;
a raised soil container support connected to the hollow post at the top end of the support structure, said raised soil container support structurally configured with a cavity, a rim, and a drain, wherein the drain is aligned and in communication with the hollow post at the top end of the support structure;
a soil container structurally configured to fit wholly or partially within the cavity of the soil container support and engage with the soil container support; and
a plurality of ribs connected to the top end of the support structure, the plurality of ribs structurally configured to affix to the rim of the raised soil container support, to extend radially about a central axis of the support structure, and to support one or more flexible connecting members between the ribs to form a trellis structurally configured to support vegetation as an elevated vegetated canopy,
wherein each of the plurality of ribs has a length between about 42 and 72 inches and the support structure is in the form of an umbrella.

14. The system of claim 13, further comprising a supply line disposed in the hollow post from the bottom end of the support structure to the top end of the support structure to provide one or more of water and nutrients from the bottom end of the support structure through the hollow post to the top end of the support structure.

15. The system of claim 14, further comprising an irrigation system comprising:
one or more of a pump and a valve connected to the supply line and structurally configured to control an amount of one or more of water and nutrients supplied through the supply line to one or more of the soil container and vegetation;
a controller programmed to control operation of one or more of the pump and the valve; and
a power supply electrically coupled to one or more of the pump, the valve, and the controller.

16. The system of claim 13, further comprising:
a plurality of substantially rigid external members, where each of the plurality of substantially rigid external members is structurally configured to engage with at least one of the plurality of ribs of the support structured,
wherein the one or more flexible connecting members are disposed along a length of one or more of the plurality of substantially rigid external members and attach at least one of the plurality of substantially rigid external members to another one of the plurality of substantially rigid external members, the plurality of substantially rigid external members and the one or more flexible connecting members thereby forming a trellis structurally configured to support vegetation as an elevated vegetated canopy.

17. The system of claim 16, where each of the plurality of substantially rigid external members comprises one or more engagement features structurally configured to cooperate with corresponding engagement features disposed on the plurality of ribs of the support structure to align the plurality of substantially rigid external members in predetermined configurations on the support structure.

18. A method, comprising:
providing a support structure comprising:
a base comprising one or more plates disposed on a bottom end of the support structure;
a hollow post extending from the bottom end of the support structure to a top end of the support structure;
a raised soil container support at the top end of the hollow post, said raised soil container support structurally configured with a cavity, a rim, and drain, wherein the drain is aligned and in communication with the support structure; and
a plurality of ribs connected to the top end of the support structure, the plurality of ribs structurally configured to affix to the rim of the raised soil container support, to extend radially about a central axis of the support structure, and to support one or more flexible connecting members between the ribs to form a trellis structurally configured to support vegetation as an elevated vegetated canopy; and
providing a soil container structurally configured to fit wholly or partially within the cavity of the raised soil container support and engage with the raised soil container support; and
providing a supply line disposed in the hollow post and extending from a bottom end of the support structure to a top end of the support structure to provide one or more of water and nutrients from the bottom end of the support structure through the hollow post to the soil container, where the soil container is disposed on the top end of the support structure; and
providing an irrigation system comprising:
one or more of a pump and a valve connected to the supply line and structurally configured to control an amount of one or more of water and nutrients supplied through the supply line to one or more of the soil container and vegetation; and a controller operable to control operation of one or more of the pump and the valve.

* * * * *